(12) United States Patent
Abe et al.

(10) Patent No.: US 7,651,764 B2
(45) Date of Patent: Jan. 26, 2010

(54) RELEASE LAYER PASTE AND METHOD OF PRODUCTION OF A MULTILAYER TYPE ELECTRONIC DEVICE

(75) Inventors: Kyotaro Abe, Narita (JP); Shigeki Sato, Narita (JP)

(73) Assignee: TDK Corporation, Tokyo (JP)

( * ) Notice: Subject to any disclaimer, the term of this patent is extended or adjusted under 35 U.S.C. 154(b) by 234 days.

(21) Appl. No.: 11/702,632

(22) Filed: Feb. 6, 2007

(65) Prior Publication Data

US 2007/0190251 A1 Aug. 16, 2007

(30) Foreign Application Priority Data

Feb. 10, 2006 (JP) .............................. 2006-034171

(51) Int. Cl.
*C08B 29/00* (2006.01)
*B05D 5/00* (2006.01)
*B05D 3/02* (2006.01)

(52) U.S. Cl. .................... 428/325; 427/258; 427/372.2; 156/89.11; 156/89.12; 524/287

(58) Field of Classification Search ................. 428/325; 156/89.11, 89.12, 289; 427/258, 372.2; 524/287
See application file for complete search history.

(56) References Cited

U.S. PATENT DOCUMENTS

| 6,544,917 | B1 * | 4/2003 | Miyanaga et al. | ........... 501/154 |
| 6,890,693 | B2 * | 5/2005 | Zhu et al. | ................. 430/58.45 |
| 7,604,858 | B2 | 10/2009 | Abe et al. | |

| 2002/0056641 | A1 * | 5/2002 | December | ................... 204/484 |
| 2003/0170432 | A1 * | 9/2003 | Kobayashi et al. | .......... 428/209 |

FOREIGN PATENT DOCUMENTS

| CN | 1912018 A | 2/2007 |
| EP | 1609771 A1 * | 12/2005 |
| JP | A 63-51616 | 3/1988 |
| JP | A 03-250612 | 11/1991 |
| JP | A 07-312326 | 11/1995 |
| JP | 2003197457 A * | 7/2003 |
| JP | A 2003-197457 | 7/2003 |

OTHER PUBLICATIONS

Oct. 9, 2009 Chinese Office Action issued in Chinese Application No. 2007-10005113.0.

* cited by examiner

*Primary Examiner*—David Wu
*Assistant Examiner*—Michael M Bernshteyn
(74) *Attorney, Agent, or Firm*—Oliff & Berridge, PLC

(57) ABSTRACT

A release layer paste used for producing a multilayer type electronic device and forming a release layer of a thickness of 0.05 to 0.1 μm, used in combination with an electrode layer paste including one or more solvents selected from limonene, dihydroterpinyl methyl ether, α-terpinyl acetate, terpinyl methyl ether, isobornyl acetate, caryophyllene, 1-dihydrocarvyl acetate, menthone, menthyl acetate, perillyl acetate, carvyl acetate, d-dihydrocarvyl acetate, and butyl carbitol acetate and a binder comprised of ethyl cellulose, including a ceramic powder, organic vehicle, plasticizer, and dispersion agent, the organic vehicle containing a binder having polyvinyl acetal as its main ingredient, a ratio (P/B) of the ceramic powder with respect to the binder and plasticizer being controlled to 1.33 to 5.56 (however, excluding 5.56).

24 Claims, 8 Drawing Sheets

US 7,651,764 B2

RELEASE LAYER PASTE AND METHOD OF PRODUCTION OF A MULTILAYER TYPE ELECTRONIC DEVICE

BACKGROUND OF THE INVENTION

1. Field of the Invention

The present invention relates to release layer paste used for production of a multilayer ceramic capacitor or other multilayer type electronic device and a method of production of a multilayer type electronic device using the release layer paste.

2. Description of the Related Art

In recent years, due to the increasingly smaller sizes of electronic apparatuses, multilayer ceramic capacitors and other multilayer type electronic devices have become increasingly compact in size and sophisticated in performance. The thicknesses of the interlayer dielectric layers of multilayer type electronic devices (dielectric layers sandwiched between pairs of internal electrodes) have become 1 μm or less—enabling over 800 stacked layers. In the process of production of such electronic devices, the thicknesses of the green sheets able to form the dielectric layers after firing have become extremely thin (usually 1.5 μm or less), so at the time of formation of the electrode layers by the printing method, the solvent of the electrode layer paste causes the green sheets to dissolve, that is, the so-called "sheet attack" phenomenon becomes a problem. This sheet attack phenomenon leads directly to defects of the green sheets and short-circuit defects, so is a problem which absolutely must be solved for making the layers thinner.

To eliminate this sheet attack, Japanese Patent Publication (A) No. 63-51616, Japanese Patent Publication (A) No. 3-250612, and Japanese Patent Publication (A) No. 7-312326 propose forming an electrode layer paste on a supporting film in a predetermined pattern, then drying it so as to separately prepare a dry electrode layer, then transferring this dry electrode layer to the surface of a green sheet or the surface of a laminate of green sheets so as to transfer the predetermined pattern of the electrode.

However, Japanese Patent Publication (A) No. 63-51616, Japanese Patent Publication (A) No. 3-250612, and Japanese Patent Publication (A) No. 7-312326 had the problem of a difficulty of peeling off the predetermined pattern of the electrode layer from the supporting film.

Therefore, the inventors proposed technology for forming a release layer between a supporting film and a predetermined pattern of an electrode layer so as to improve the peelability of the electrode layer (see Japanese Patent Publication (A) No. 2003-197457).

In Japanese Patent Publication (A) No. 2003-197457, as the release layer paste used for forming the release layer, use was made of one comprised of a binder dissolved in a solvent to form an organic vehicle into which at least a ceramic powder and plasticizer were dissolved. As the binder in the organic vehicle, one the same as the binder contained in the green sheet, that is, polyvinyl butyral (acetal group $R=C_3H_7$), which is a type of polyvinyl acetal-based resin, was used. Further, as the solvent in the organic vehicle contained in the electrode layer paste used for forming the predetermined patterns of electrode layers, terpineol, dehydroterpineol, etc. was used.

However, if using an electrode layer paste using terpineol or dehydroterpineol as a solvent together with a release layer using a butyral resin as a binder, the solvent of the electrode layer paste causes sheet attack at the release layer. Further, at the time of printing the electrode layer paste, the release layer is ablated and residue sometimes generated.

Sheet attack of the release layer becomes a cause of bleedout, shedding, and pinholes at the electrode layer or blank pattern layer formed on the surface of the release layer. This in turn can increase the short-circuit defects of the final multilayer type electronic device.

Therefore, prevention of sheet attack of the release layer has been strongly demanded.

SUMMARY OF THE INVENTION

The present invention was made in consideration of this situation and has as its object the provision of a release layer paste used for production of a multilayer electronic device which does not cause sheet attack on an electrode layer paste for forming an electrode layer (if necessary, further a blank pattern layer paste for forming a blank pattern layer) and which enables formation of a release layer free of bleedout, shedding, and pinholes at the time of printing of the paste and a method of production of a multilayer electronic device using the release layer paste. In particular, the present invention has as its object the provision of a release layer paste which enables the above characteristics to be achieved even if making the release layer thin.

To achieve the above object, according to the present invention, there is provided a release layer paste used for producing a multilayer type electronic device and forming a release layer of a thickness of 0.05 to 0.1 μm, used in combination with an electrode layer paste including one or more solvents selected from limonene, dihydroterpinyl methyl ether, α-terpinyl acetate, terpinyl methyl ether, isobornyl acetate, caryophyllene, 1-dihydrocarvyl acetate, menthone, menthyl acetate, perillyl acetate, carvyl acetate, d-dihydrocarvyl acetate, and butyl carbitol acetate and a binder comprised of ethyl cellulose, including a ceramic powder, organic vehicle, plasticizer, and dispersion agent, the organic vehicle containing a binder having polyvinyl acetal as its main ingredient, a ratio (P/B) of the ceramic powder with respect to the binder and plasticizer being controlled to 1.33 to 5.56 (however, excluding 5.56).

According to the present invention, there is provided a release layer paste used for producing a multilayer type electronic device and forming a release layer of a thickness of 0.05 to 0.1 μm, used in combination with an electrode layer paste including one or more solvents selected from limonene, dihydroterpinyl methyl ether, α-terpinyl acetate, terpinyl methyl ether, isobornyl acetate, caryophyllene, 1-dihydrocarvyl acetate, menthone, menthyl acetate, perillyl acetate, carvyl acetate, d-dihydrocarvyl acetate, and butyl carbitol acetate and a binder comprised of ethyl cellulose, including a ceramic powder, organic vehicle, plasticizer, and dispersion agent, the organic vehicle containing a binder having polyvinyl acetal as its main ingredient, the binder being contained in an amount of 12 to 50 parts by weight with respect to 100 parts by weight of the ceramic powder (however, excluding 12 parts by weight).

Preferably, the polyvinyl acetal has a polymerization degree of 2000 to 3600 and an acetalization degree of 66 to 74 mol %.

Preferably, the plasticizer is at least one plasticizer selected from the group of dibutyl phthalate (DBP), dioctyl phthalate (DOP), and butylbenzyl phthalate (BBP) and is contained in an amount of 0 to 100 parts by weight (however, excluding 0 part by weight and 100 parts by weight) with respect to 100 parts by weight of the ceramic powder.

Preferably, the ceramic powder has an average particle size of larger than 0.02 μm and 0.1 μm or less.

Preferably, the dispersion agent is a nonionic dispersion agent and is contained in an amount of 1 to 3 parts by weight with respect to 100 parts by weight of the ceramic powder.

Preferably, the organic vehicle contains a solvent comprised of at least one of ethyl alcohol, methylethylketone, methylisobutylketone, propanol, xylene, and toluene and contained so as to give a concentration of nonvolatile ingredients of 5 to 20 wt %.

According to the present invention, there is provided a method of production of a multilayer type electronic device comprising:

a step of forming a release layer of a thickness of 0.05 to 0.1 μm on a releasing side of a first supporting sheet treated for releasing, a step of forming an electrode layer on the surface of the release layer in a predetermined pattern, a step of forming a green sheet on the surface of the electrode layer to obtain a green sheet having an electrode layer, a step of stacking the green sheets having electrode layers to form a green chip, and a step of firing the green chip, wherein as the release layer paste for forming the release layer, any of the above release layer paste is used.

Preferably, the method further comprises treating the first supporting sheet for releasing by coating it with a release agent mainly comprised of silicone and controlling a peeling strength of the first supporting sheet to 8 to 20 mN/cm (however, excluding 8 mN/cm).

Preferably, the method further comprises treating the first supporting sheet for releasing by coating it with a release agent mainly comprised of an alkyd resin and controlling a peeling strength of the first supporting sheet to 50 to 130 mN/cm (however, excluding 50 mN/cm and 130 mN/cm).

Preferably, the ceramic powder contained in the release layer paste has the same composition as the ceramic powder contained in the paste for forming the green sheet.

Preferably, a thickness of the release layer and a thickness of the green sheet minus the thickness of the electrode layer part total 1.0 μm or less.

The method of production of a multilayer type electronic device of the present invention may also comprise, before forming the green sheet, forming on the surface of the release layer where the electrode layer is not formed a blank pattern layer to the same thickness as the electrode layer and of the same material as the green sheet.

The method of production of a multilayer type electronic device of the present invention may also comprise, before stacking the green sheets having electrode layers, forming an adhesive layer on the surface of the green sheet having electrode layers opposite to the electrode layer side and stacking the green sheets having electrode layers through the adhesive layers.

The release layer paste of the present invention may be used for formation of the release layer in a method of production of a multilayer electronic device having a step of forming a release layer of a thickness of 0.05 to 0.1 μm at the releasing treated side of the first supporting sheet treated for releasing, a step of forming an electrode layer on the surface of the release layer by a predetermined pattern, a step of forming a green sheet on the surface of the electrode layer to obtain a green sheet having an electrode layer, a step of peeling off the green sheet having the electrode layer from the first supporting sheet, then stacking them to form a green chip, and a step of firing the green chip.

The release layer paste of the present invention contains polyvinyl acetal as the main ingredient in the binder forming the paste. The polyvinyl acetal contained in the paste in the present invention is hard to be dissolved or swelled by (is hardly soluble with) the solvent in the electrode layer paste or blank pattern layer paste for forming the electrode layer or blank pattern layer, that is, the limonene, dihydroterpinyl methyl ether, α-terpinyl acetate, terpinyl methyl ether, isobornyl acetate, caryophyllene, 1-dihydrocarvyl acetate, menthone, menthyl acetate, perillyl acetate, carvyl acetate, d-dihydrocarvyl acetate, or butyl carbitol acetate. For this reason, the release layer formed using the release layer paste of the present invention has the effect of being free from sheet attack from the electrode layer paste or blank pattern layer paste. As a result, the printability of the electrode layer paste or blank pattern layer paste for forming the electrode layer or blank pattern layer with respect to the release layer formed using the release layer paste of the present invention is stable. Specifically, it is possible to prevent the occurrence of bleedout, shedding, and pinholes of the electrode layer or blank pattern layer formed on the surface of the release layer. Bleedout, shedding, and pinholes of the electrode layer or blank pattern layer easily occurs due to exposure of the surface of the supporting sheet due to the dissolution of the release layer. The release layer formed using the release layer paste of the present invention is free from sheet attack from the electrode layer paste or blank pattern layer paste, so there is no occurrence of bleedout, shedding, and pinholes of the electrode layer or blank pattern layer formed on the surface of the release layer.

In particular, in the present invention, since the above solvents is used as the solvent contained in the electrode layer paste or blank pattern layer paste used in combination, even if the release layer is made a thin 0.1 μm or less, the occurrence of sheet attack and the occurrence of bleedout, shedding, and pinholes of the electrode layer or blank pattern layer can be effectively prevented. For this reason, the release layer can be made thinner. Due to this, the dielectric layer can be made thinner for the following reasons.

At the time of production of the multilayer electronic device, when forming the electrode layer in a predetermined pattern on the surface of the release layer, forming a green sheet on the surface of the electrode layer, stacking these to fabricate a green chip, and firing this to produce a multilayer electronic device, if including ceramic powder or another dielectric material in the release layer, the dielectric layer of the obtained multilayer electronic device will be comprised of the ceramic powder contained in the green sheet and the ceramic powder contained in the release layer fired together. That is, the thickness of the dielectric layer will depend on the thickness of the green sheet and the thickness of the release layer.

For this reason, to make the fired, dielectric layer a predetermined thickness, if forming the release layer thick, it is necessary to make the green sheet relatively thinner. However, if ending up making the green sheet thinner, the ratio of the green sheet providing the permittivity or other desired dielectric characteristics in the dielectric layer will end up becoming smaller and the dielectric characteristics of the dielectric layer will end up being impaired.

Therefore, to make the dielectric layer thinner, while to realize the desired dielectric characteristics, for making the multilayer electronic device smaller in size and higher in performance, it is important to reduce the thickness of the release layer as much as possible.

Further, when the release layer is attacked by the electrode layer paste or blank pattern layer paste, the dissolved binder will end up being localized in the release layer. That is, the release layer will end up being formed with parts where almost no binder is present and parts where the binder is strongly present. Further, if the dissolved binder ends up becoming localized in the release layer, specifically due to the effect of the parts of the release layer where the binder is strongly present, a large force (peeling strength) will be required when peeling off the release layer from the first supporting sheet. If this strength is too large, the release layer is liable to break when peeling, so the strength is preferably small.

In the present invention, preferably the peeling strength of the first supporting sheet is controlled to 8 to 20 mN/cm (however, excluding 8 mN/cm), whereby even if used combined with an electrode layer paste using the above solvents, the release layer formed using the release layer paste of the present invention will not drop off from the first supporting sheet.

The multilayer electronic device according to the present invention is not particularly limited. A multilayer ceramic capacitor, multilayer piezoelectric device, multilayer chip inductor, multilayer chip varistor, multilayer chip thermistor, multilayer chip resistor, or other surface mounted chip type electronic device (SMD) may be illustrated.

BRIEF DESCRIPTION OF THE DRAWINGS

Embodiments of the present invention will be explained in detail below with reference to the drawings. Here.

DESCRIPTION OF THE PREFERRED EMBODIMENTS

In the present embodiment, as the multilayer electronic device, a multilayer ceramic capacitor is explained as an example.

Multilayer Ceramic Capacitor

Figure 1:
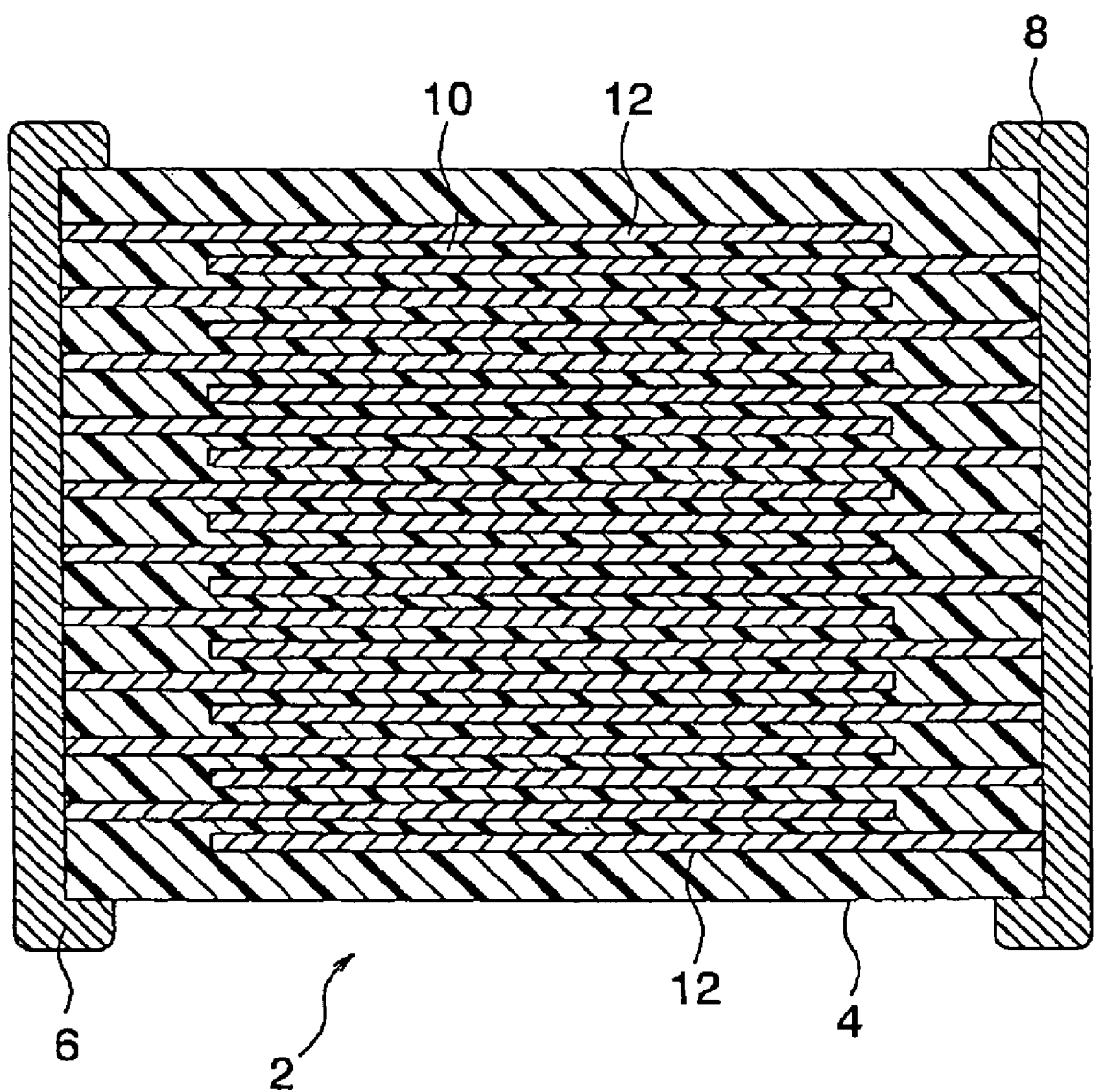
FIG. 1 is a schematic cross-sectional view of a multilayer ceramic capacitor according to an embodiment of the present invention.

As shown in FIG. 1, the multilayer ceramic capacitor 2 according to an embodiment of the present invention has a capacitor body 4 comprised of dielectric layers 10 and internal electrode layers 12 alternately stacked. This capacitor body 4 is formed at its two side ends with a pair of external electrodes 6, 8 connected to the internal electrode layers 12 alternately arranged inside the body 4. The internal electrode layers 12 are stacked so that the side end faces are alternately exposed at the surfaces of the two facing ends of the capacitor body 4. The pair of external electrodes 6, 8 is formed at the two ends of the capacitor body 4 and is connected to the exposed end faces of the alternately arranged internal electrode layers 12 to form a capacitor circuit.

The external shape and dimensions of the capacity body 4 are not particularly limited and can be suitably set in accordance with the application. Usually, the external shape is made a substantially parallelepiped shape and the dimensions are made normally (0.4 to 5.6 mm)×(0.2 to 5.0 mm)×(0.2 to 1.9 mm) or so.

Figure 2A:
FIG. 2A to FIG. 2C are cross-sectional views of principal parts showing a method of formation of an electrode layer and green sheet according to an embodiment of the present invention.
Figure 2B:
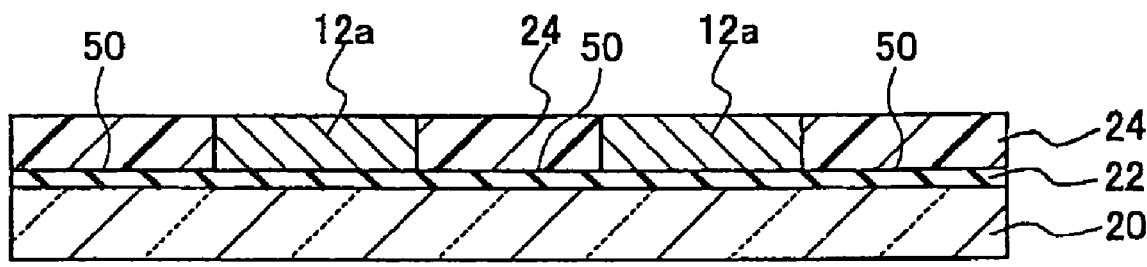
Figure 2C:
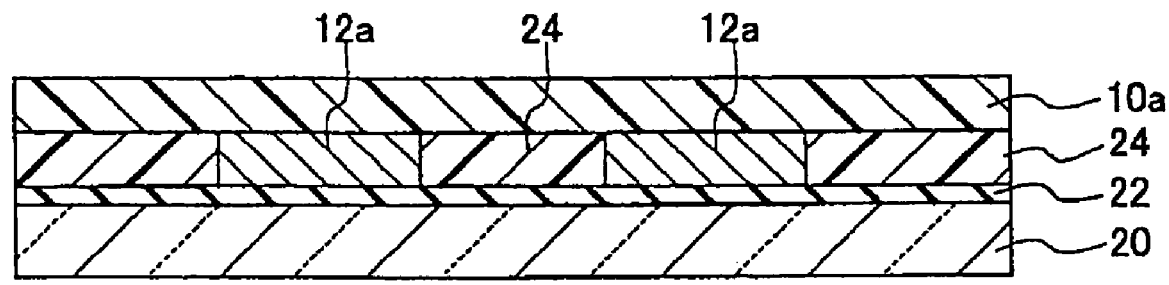

The dielectric layers 10a reformed by firing the green sheets 10a shown in FIG. 2C etc. They are not particularly limited in material. For example, they may be formed by calcium titanate, strontium titanate, and/or barium titanate or another dielectric material. The thickness of each of the dielectric layers 10 is, in the present embodiment, preferably reduced to 5 μm or less, more preferably 3 μm or less.

The internal electrode layers 12 are formed by firing predetermined patterns of electrode layers 12a formed by the electrode layer paste shown in FIG. 2B or FIG. 2C. The thickness of each of the internal electrode layers 12 is preferably reduced to 1.5 μm or less, more preferably 1.0 μm or less.

The material of external electrodes 6, 8 used is usually copper or a copper alloy, nickel or a nickel alloy, etc., but silver or a silver and palladium alloy etc. can also be used. The thickness of the external electrodes 6, 8 is not particularly limited, but usually is 10 to 50 μm or so.

Method of Production of Multilayer Ceramic Capacitor

Next, an example of the method of production of a multilayer ceramic capacitor 2 according to the present embodiment will be explained.

Formation of Release Layer (1) In the present embodiment, first, as shown in FIG. 2A, a carrier sheet 20 is formed with a release layer 22.

As the carrier sheet 20, for example, a PET film etc. is used. To improve it in peelability, it is coated with a release agent mainly comprised of silicone, etc. The peeling strength of the carrier sheet 20 from the later mentioned release layer 22 is preferably controlled to 8 to 20 mN/cm (however, excluding 8 mN/cm), more preferably 10 to 15 mN/cm in range. A release agent mainly comprised of an alkyd resin may also be used for coating. The peeling strength of the carrier sheet 20 from the later mentioned release layer 22 may be controlled preferably to 50 to 130 mN/cm (however, excluding 50 mN/cm and 130 mN/cm), more preferably 60 to 100 mN/cm in range.

By controlling the peeling strength to this range, as explained later, even if used together with an electrode layer paste using, limonene, dihydroterpinyl methyl ether, α-terpinyl acetate, terpinyl methyl ether, isobornyl acetate, caryophyllene, 1-dihydrocarvyl acetate, menthone, menthyl acetate, perillyl acetate, carvyl acetate, d-dihydrocarvyl acetate, or butyl carbitol acetate as a solvent, the later mentioned release layer 22 will not drop off the carrier sheet 20. The thickness of the carrier sheet 20 is not particularly limited, but preferably is 5 to 100 μm.

The thickness of the release layer 22 is preferably made 0.05 to 0.1 μm, more preferably 0.05 to 0.07 μm. If the release layer 22 is too thin, the effect of forming this can no longer be obtained. On the other hand, if the release layer 22 is too thick, a higher cost will end up being incurred due to the increase of the material for forming the release layer and, also, the later explained electrode layer 12a (see FIG. 2B) will end up becoming hard to peel off from the carrier sheet 20 and the electrode layer 12a will be liable to be damaged at the time of peeling.

The method of forming the release layer 22 is not particularly limited so long as it allows an extremely thin layer to be uniformly formed, but in the present embodiment, a coating method using a release layer paste (for example, using a wire-bar coater or die coater).

The release layer paste used in the embodiment contains a ceramic powder, organic vehicle, plasticizer, and dispersion agent. Further, usually it also contains a release agent.

As the ceramic powder, one of the same composition as the ceramic powder contained in the later explained green sheet 10a is used. By doing this, even if the ingredients of the release layer 22 react with the green sheet 10a during firing, the composition will not change.

The ceramic powder preferably has an average particle size the same as or smaller than the thickness of the release layer 22 after forming and drying the paste. Specifically, it is preferably 0.1 µm or less, more preferably 0.07 µm or less. If the ceramic powder has too large an average particle size, the release layer 22 becomes hard to be made thin.

On the other hand, the ceramic powder preferably has an average particle size with a lower limit of over 0.02 µm. Further, the ceramic powder preferably has a specific surface area less than 50 m$^2$/g. If the ceramic powder is too small in particle size or is too large in the specific surface area, the ceramic powder will end up agglomerating and the obtained release layer will become greater in surface roughness ending up causing short-circuit defects.

The ceramic powder is contained in the release layer paste in a range so that the nonvolatile concentration becomes 5 to 20 wt %, more preferably 10 to 15 wt %. If the ceramic powder is too small in content, the paste viscosity becomes low and formation of a layer by coating becomes difficult, while if the ceramic powder is too great in content, it becomes difficult to make the coated thickness small.

The organic vehicle contains a binder and a solvent. The binder, in the present embodiment, has polyvinyl acetal (acetal group R=CH$_3$), a type of polyvinyl acetal-based resin, as its main ingredient.

The content of the polyvinyl acetal in the binder is preferably 95 wt % or more, more preferably 100 wt %. As a resin able to be used in combination with polyvinyl acetal, though in a very small amount, there are polyvinyl acetal-based resins other than polyvinyl acetal, an acryl resin, ethyl cellulose, etc.

As a polyvinyl acetal-based resin other than polyvinyl acetal, polyvinyl acetoacetal, polyvinyl butyral (acetal group R=C$_3$H$_7$), polyvinyl formal (acetal group R=H), polyvinyl benzal, polyvinyl phenylacetal, polyvinyl propional, polyvinyl hexanal, etc. may be illustrated.

The polyvinyl acetal used in the embodiment preferably has a polymerization degree of 2000 to 3600, more preferably 2000 to 3000. If the polymerization degree is less than 2000, sheet attack is liable to occur, while if over 3600, the release layer paste becomes higher in viscosity, so the dispersability of the ceramic powder is poor and a homogeneous paste tends to become difficult to obtain.

Further, the polyvinyl acetal used in the embodiment has an amount of residual acetyl groups of normally 3 mol % or less.

Further, the polyvinyl acetal used in the embodiment preferably has an acetalization degree (content of acetal groups) of 66 to 74 mol %. If the acetalization degree is less than 66 mol %, sheet attack is liable to occur, while if over 74 mol %, production is extremely difficult. Note that the acetalization degree of the polyvinyl acetal can be calculated by measuring the amount of residual acetyl groups and amount of vinyl alcohol based on the JIS-K6729 "Polyvinyl Formal Test Method" and subtracting the amounts of the two ingredients from 100.

The binder is preferably contained in the release layer paste in an amount, with respect to 100 parts by weight of the ceramic powder, of 12 to 50 parts by weight (however, excluding 12 parts by weight), more preferably 20 to 30 parts by weight. If the amount of the binder is too small, when forming later explained electrode layer 12a and blank pattern layer 24, the release layer 22 dissolves and electrode shedding easily occurs and continuous printing of 500 times or more becomes hard to withstand, while if too large, the peeling of the electrode layer 12a and blank pattern layer 24 becomes difficult. When the content of the binder is 20 to 30 parts by weight with respect to 100 parts by weight of the ceramic powder, sheet attack of the release layer 22 is effectively prevented. As a result, there is no longer any deposition of powder of the release layer on the back side of the printing plate due to sheet attack of the release layer and there is no longer any change in the printing conditions at the time of continuous printing.

Further, the ratio (P/B) of the ceramic powder with respect to the binder and later explained plasticizer is controlled to 1.33 to 5.56 (however, excluding 5.56), preferably 1.85 to 2.78, by adjusting the amount of binder. If (P/B) is too small, the release layer 22 dissolves when forming the electrode layer 12a and blank pattern layer 24 and electrode shedding easily occurs and continuous printing of 500 times or more can no longer be withstood, while if too-large, peeling of the electrode layer 12a and blank pattern layer 24 becomes difficult.

The solvent is not particularly limited, but alcohol, acetone, methylethylketone (MEK), mineral spirits, methylisobutylketone (MIBK), toluene, xylene, ethyl acetate, etc. may be illustrated. Preferably, at least one type of solvent from alcohol, ketones, toluene, xylene, etc., more preferably ethyl alcohol, MEK, MIBK, propanol, xylene, and toluene is used. The solvent is contained so that the concentration of nonvolatile ingredients in the release layer paste is 5 to 20 wt %, more preferably 10 to 15 wt %.

The plasticizer is not particularly limited. Phthalic acid ester, adipic acid, phosphoric acid ester, glycols, etc. may be illustrated. In the present embodiment, preferably dioctyl adipate (DOA), butyl phthalate butyleneglycol (BPBG), didodecyl phthalate (DDP), dibutyl phthalate (DBP), dioctyl phthalate (DOP), butylbenzyl phthalate (BBP), dibutyl sebacate, etc. may be used. Among these, at least one solvent selected from DBP, DOP, and BBP is particularly preferably used. Use of at least one solvent selected from DBP, DOP, and BBP has the merit that the peeling strength becomes lower.

The plasticizer is contained in an amount, with respect to 100 parts by weight of the ceramic powder, of preferably 0 to 100 parts by weight (however, excluding 0 parts by weight and 100 parts by weight), more preferably 20 to 70 parts by weight. The plasticizer controls the Tg of the binder in the organic vehicle. By its addition, the peeling strength of the release layer becomes greater, but the stackability (adherability at time of stacking) is improved. Basically, there is no problem even with zero addition of the plasticizer, but when adding this for improving the stackability, transfer, etc., the upper limit is, with respect to 100 parts by weight of the ceramic powder, preferably 100 parts by weight. If the adding amount of the plasticizer is too large, it causes the plasticizer to bleed out or causes the release layer to increase in tackiness resulting in sticking to the screen or adhesion to the running system, so continuous printing becomes difficult.

The dispersion agent is not particularly limited, but a polyethylene glycol-based dispersion agent, polycarboxylic acid-based dispersion agent, polyhydric alcohol partial ester-based dispersion agent, ester-based dispersion agent, ether-based dispersion agent, etc. may be illustrated. In addition, there are a block polymer type dispersion agent or a graft polymer type dispersion agent. In the present embodiment, preferably a polyethylene glycol-based dispersion agent or another nonionic dispersion agent is used.

The dispersion agent is contained in an amount, with respect to 100 parts by weight of the ceramic powder, of preferably 1 to 3 parts by weight, more preferably 1.5 to 2.5 parts by weight. The dispersion agent has the effects of improvement of the dispersability of the pigment (ceramic powder) and improvement of the stability of the coating (aging). If the content of the dispersion agent is too small, the effect of adding this becomes insufficient, while if too great, the problem of a drop in the dispersability due to micelle formation or recoagulation sometimes arises.

The release agent is not particularly limited, but paraffin, a wax, aliphatic acid esters, silicone oil, etc. may be illustrated. The release agent used here may be the same as or different from the release agent contained in the green sheet 10a. The release agent is contained in an amount, with respect to 100 parts by weight of the binder in the organic vehicle, of preferably 5 to 20 parts by weight, more preferably 5 to 10 parts by weight.

Further, the release layer paste may further contain an anti-static aid or other additive.

The release layer paste may be formed by mixing the above ingredients by a ball mill etc. to make a slurry.

This release layer paste is coated on the carrier sheet 20, then dried to form the release layer 22. The drying temperature is not particularly limited, but preferably is 50 to 100° C. The drying time is preferably 1 to 10 minutes.

Formation of Electrode Layer (2) Next, as shown in FIG. 2B, the surface of the release layer 22 formed on the carrier sheet 20 is formed with a predetermined pattern of an electrode layer (internal electrode pattern) 12a giving the internal electrode layer 12 shown in FIG. 1 after firing.

The thickness of the electrode layer 12a is preferably 0.1 to 2.0 μm, more preferably 0.1 to 1.0 μm or so. The thickness of the electrode layer 12a is, with the current art, within that range or so, but the thinner the better in the range where electrode breakage does not occur. The electrode layer 12a may be formed by a single layer or be formed by a plurality of layers with two or more different compositions. Further, in the present embodiment, since the release layer 22 is formed with the electrode layer 12a, electrode shedding can be effectively prevented and the electrode layer 12a can be formed well with a high precision.

The method of formation of the electrode layer 12a is not particularly limited so long as it is a method that can form the layer uniformly. For example, screen printing or gravure printing or another thick film forming method using the electrode layer paste or vapor deposition, sputtering, or another thin film method may be mentioned, but in the present embodiment, the case of using the electrode layer paste for the thick film method of screen printing or gravure printing is illustrated.

The electrode layer paste used in the present embodiment contains a conductive powder and an organic vehicle.

The conductive powder is not particularly limited, but preferably is comprised of at least one material selected from Cu, Ni, and their alloys, more preferably is comprised of Ni or an Ni alloy or mixtures of the same.

As the Ni or Ni alloy, an alloy of at least one element selected from Mn, Cr, Co, and Al with Ni is preferable. The Ni content in the alloy is preferably at least 95 wt %. Further, the Ni or Ni alloy may contain P, Fe, Mg, or other various trace ingredients up to 0.1 wt % or so or less.

This conductive powder is not particularly limited in shape and may be spherical, flake shaped, etc. and may be a mixture of these shapes. Further, the particle size of the conductive powder is, in the case of spheres, usually 0.1 to 2 μm, preferably 0.2 to 1 μm or so.

The conductive powder is contained in the electrode layer paste in an amount of preferably 30 to 70 wt %, more preferably 40 to 50 wt %.

The organic vehicle contains a binder and a solvent. The binder is not particularly limited, but ethyl cellulose, acryl resin, polyvinyl butyral, polyvinyl acetal, polyvinyl alcohol, polyolefin, polyurethane, polystyrene, or copolymers of the same etc. may be illustrated. In the present embodiment, due to its superior dispersion ability and viscosity characteristics, ethyl cellulose is used. The binder is contained in the electrode layer paste in an amount, with respect to 100 parts by weight of the conductive powder, of preferably 8 to 20 parts by weight.

The solvent may be suitably selected in accordance with the type of binder, but in the present embodiment limonene, dihydroterpinyl methyl ether, α-terpinyl acetate, terpinyl methyl ether, isobornyl acetate, caryophyllene, 1-dihydrocarvyl acetate, menthone, menthyl acetate, perillyl acetate, carvyl acetate, d-dihydrocarvyl acetate, or butyl carbitol acetate is used. These solvents may be used alone or in mixtures of two or more types.

The electrode layer paste, in the same way as the above release layer paste, may contain as an co-material a ceramic powder of the same composition as the ceramic powder contained in the later explained green sheet 10a. The co-material has the effect of suppressing sintering of the conductive powder in the firing process. The ceramic powder used as the co-material is contained in the electrode layer paste in an amount, with respect to 100 parts by weight of the conductive powder, of preferably 5 to 25 parts by weight.

The electrode layer paste preferably contains, for the purpose of improving the adherability with the green sheet, a plasticizer or tackifier. As the plasticizer, a phthalic acid ester, adipic acid, phosphoric acid ester, glycols, etc. may be illustrated. The plasticizer is contained in an amount, with respect to 100 parts by weight of the binder in the organic vehicle, of preferably 10 to 300 parts by weight. If the content of the plasticizer is too small, there is no effect of addition, while if too great, the electrode layer 12a formed seriously falls in strength and, further, excess plasticizer tends to bleed out from the electrode layer 12a.

The electrode layer paste can be formed by kneading the above ingredients by a ball mill etc. to form a slurry.

Formation of Blank Pattern Layer (3) In the present embodiment, after or before the surface of the release layer 22 is formed with a predetermined pattern of an electrode layer 12a by the printing method, the clearances on the surface of the release layer 22 where the electrode layer 12a is not formed shown in FIG. 2B (blank pattern parts 50) are formed with a blank pattern layer 24 of the same thickness as the electrode layer 12a. The thickness of the blank pattern layer 24 is made the same as the thickness of the electrode layer 12a since a step difference will arise if they are not substantially the same.

The blank pattern layer 24 is comprised of the same material as the later explained green sheet 10a. Further, the blank pattern layer 24 can be formed by the same method as with the electrode layer 12a or the later mentioned green sheet 10a (using blank pattern layer paste).

This blank pattern layer paste is coated at the blank pattern parts 50 between the electrode layers 12a. After this, the electrode layer 12a and blank pattern layer 24 are dried if necessary. The drying temperature is not particularly limited, but preferably is 70 to 120° C., while the drying time is preferably 5 to 15 minutes.

Formation of Green Sheet (4) Next, as shown in FIG. 2C, the surfaces of the electrode layer 12a and blank pattern layer 24 are formed with a green sheet 10a forming the dielectric layer 10 shown in FIG. 1 after firing.

The green sheet 10a has a thickness of preferably 0.5 to 30 μm, more preferably 0.5 to 10 μm or so.

Note that in the present embodiment, the thickness of the green sheet 10a is preferably in the following range in relation to the thickness of the release layer 22. That is, the green sheet 10a is preferably formed so that the thickness of the green sheet 10a and the thickness of the release layer 22 total 1.0 μm or less. The release layer 22 contains a ceramic powder, so after firing, forms a dielectric layer 10 along with the green sheet 10a. Therefore, from the viewpoint of reducing the thickness of the dielectric layer 10, the total thicknesses of these is preferably in the above range.

The method of formation of the green sheet 10a is not particularly limited so long as it is a method able to form the layer uniformly, but in the present embodiment, the case of use of a dielectric paste and use of the doctor blade method is illustrated.

The dielectric paste used in the present embodiment usually is comprised of an organic solvent-based paste obtained by kneading a ceramic powder and organic vehicle.

As the ceramic powder, it is possible to suitably select and mix ones from complex oxides or various compounds forming oxides, for example, carbonates, nitrates, hydroxides, and organometallic compounds etc. The ceramic powder usually is used as a powder having an average particle size of 0.4 μm or less, preferably 0.1 to 3.0 μm or so. Further, to form an extremely thin ceramic green sheet, it is preferable to use powder finer than the thickness of the ceramic green sheet.

The organic vehicle contains a binder and a solvent. The binder is not particularly limited, but ethyl cellulose, polyvinyl butyral, acryl resin, or another usual binder may be illustrated. The solvent is not particularly limited, but terpineol, alcohol, butyl carbitol, acetone, methylethylketone (MEK) toluene, xylene, ethyl acetate, butyl stearate, isobornyl acetate, or another usual organic solvent may be illustrated.

The ingredients in the dielectric paste are not particularly limited in content. The usual contents, for example, for a binder, 1 to 5 wt % or so, while for a solvent (or water), 10 to 50 wt % or so, are suitable.

The dielectric paste may contain, in accordance with need, additives selected from various dispersion agents, plasticizers, dielectrics, subcomponent compounds, glass frit, insulators, etc. When adding these additives to the dielectric paste, the total content is preferably made about 10 wt % or less.

As the plasticizer, dioctyl phthalate, benzylbutyl phthalate, or other phthalic acid esters, adipic acid, phosphoric acid esters, glycols, etc. may be illustrated.

The plasticizer when using a butyral resin as the binder preferably is contained in an amount, with respect to 100 parts by weight of the binder resin, of 25 to 100 parts by weight. If the amount of plasticizer is too small, the green sheet tends to become brittle, while if too great, the plasticizer bleeds out and handling is difficult.

The above dielectric paste is used to form a green sheet 10a on the surfaces of the electrode layer 12a and blank pattern layer 24 by the doctor blade method.

Figure 3A:
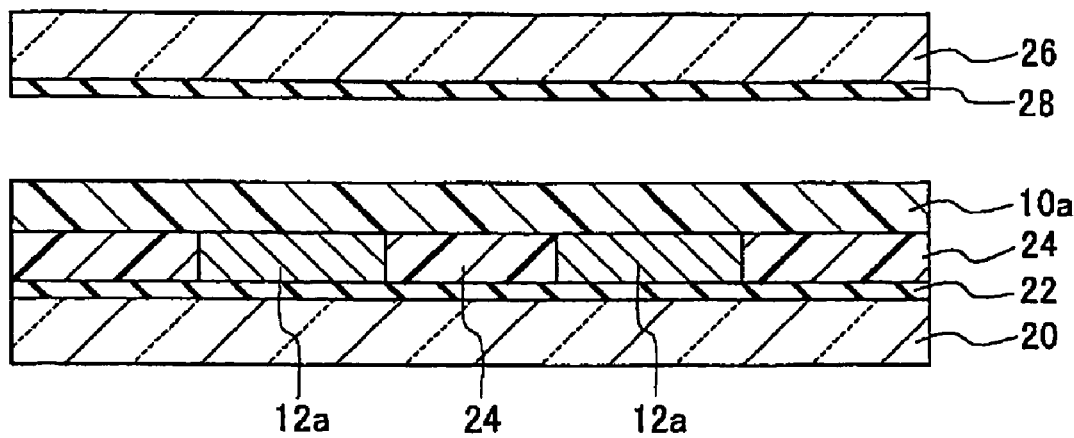
FIG. 3A to FIG. 3C are cross-sectional views of principal parts showing a method of formation of a bonding layer according to an embodiment of the present invention.

Formation of Adhesive Layer (5) In the present embodiment, next, to form an adhesive layer 28 on the surface of 10a, separate from the above carrier sheet 20, as shown in FIG. 3A, a second supporting sheet constituted by a carrier sheet 26 may be formed on its surface with an adhesive layer 28 to prepare an adhesive layer transfer sheet.

The carrier sheet 26 may be comprised of a sheet of the same material as the carrier sheet 20. The thickness of the adhesive layer 28 is preferably 0.3 μm or less and further is preferably thinner than the average particle size of the ceramic powder contained in the green sheet 10a.

The method of forming the adhesive layer 28 on the surface of the carrier sheet 26 is not particularly limited so long as it is a method enabling the layer to be formed uniformly, but in the present embodiment, a method using an adhesive layer paste, for example, the bar coater method, die coater method, reverse coater method, dip coater method, kiss coater method, or other method is used.

The adhesive layer paste used in the present embodiments contains an organic vehicle and a plasticizer.

The organic vehicle contains a binder and solvent. The binder may be the same as or different from the binder contained in the green sheet 10a. The solvent is not particularly limited. As explained above, the usual organic solvents may be used.

The plasticizer is not particularly limited, but a phthalic acid ester, adipic acid, phosphoric acid ester, glycols, etc. may be illustrated.

The adhesive layer paste may contain ceramic powder of the same composition as the ceramic powder contained in the green sheet 10a and may further contain an imidazoline-based anti-static agent or other anti-static agent.

The adhesive layer paste may be formed by kneading the above ingredients by a ball mill etc. to be a slurry.

This adhesive layer paste is coated on the surface of the second supporting sheet constituted by the carrier sheet 26 by the above various coating methods, then the adhesive layer 28 is dried when necessary.

Figure 3B:
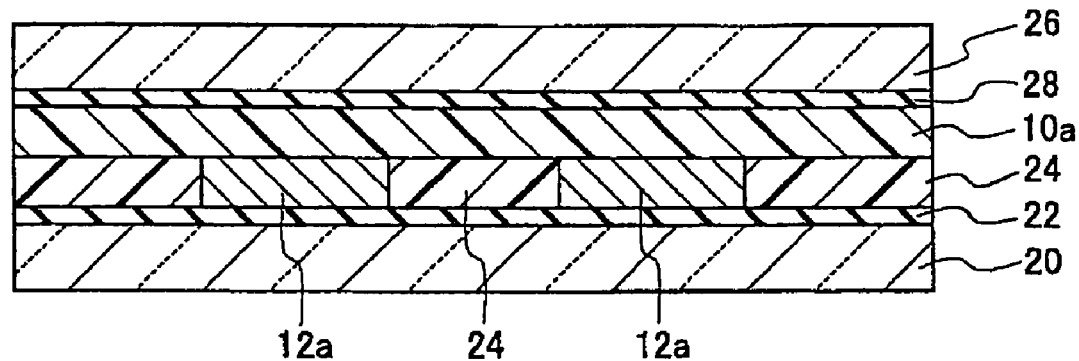
Figure 3C:
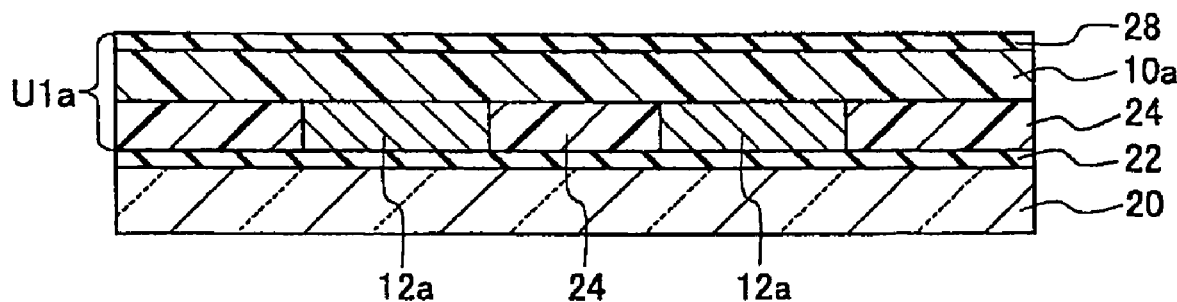

Formation of Laminate Units (6) Next, the green sheet 10a formed with the electrode layer 12a and blank pattern layer 24 shown in FIG. 2C is formed on its surface with an adhesive layer 28 to obtain a laminate unit U1a shown in FIG. 3C.

In the present embodiment, the transfer method is employed as the method of formation of the adhesive layer 28. That is, as shown in FIG. 3A and FIG. 3B, the adhesive layer 28 of the adhesive layer transfer sheet prepared in the above way is pressed against the surface of the green sheet 10a and hot pressed. Then the carrier sheet 26 is peeled off so as to thereby, as shown in FIG. 3C, transfer the adhesive layer 28 to the surface of the green sheet 10a and obtain the laminate unit U1a.

By forming the adhesive layer 28 by the transfer method, it is possible to effectively prevent the ingredients of the adhesive layer from bleeding out to the green sheet 10a or electrode layer 12a or blank pattern layer 24. Therefore, the composition of the green sheet 10a or electrode layer 12a or blank pattern layer 24 is not liable to be adversely affected. Further, even when forming the adhesive layer 28 thin, since the ingredients of the adhesive layer will not bleed out to the green sheet 10a or electrode layer 12a or blank pattern layer 24, the adherability can be kept high.

The heating temperature at the time of transfer is preferably 40 to 100° C. Further, the pressing strength is preferably 0.2 to 15 MPa. The pressing operation may be pressing by a press or pressing by calendar rolls, but pressing by a pair of rolls is preferable.

Formation of Green Chip (7) Next, a plurality of the obtained laminate units U1a is stacked to form a green chip.

In the present embodiment, the laminate units U1a are stacked, as shown in FIG. 4A, FIG. 4B and FIG. 5A, FIG. 5B, by adhering each laminate units through the adhesive layers 28. Below, the method of stacking will be explained.

Figure 4A:
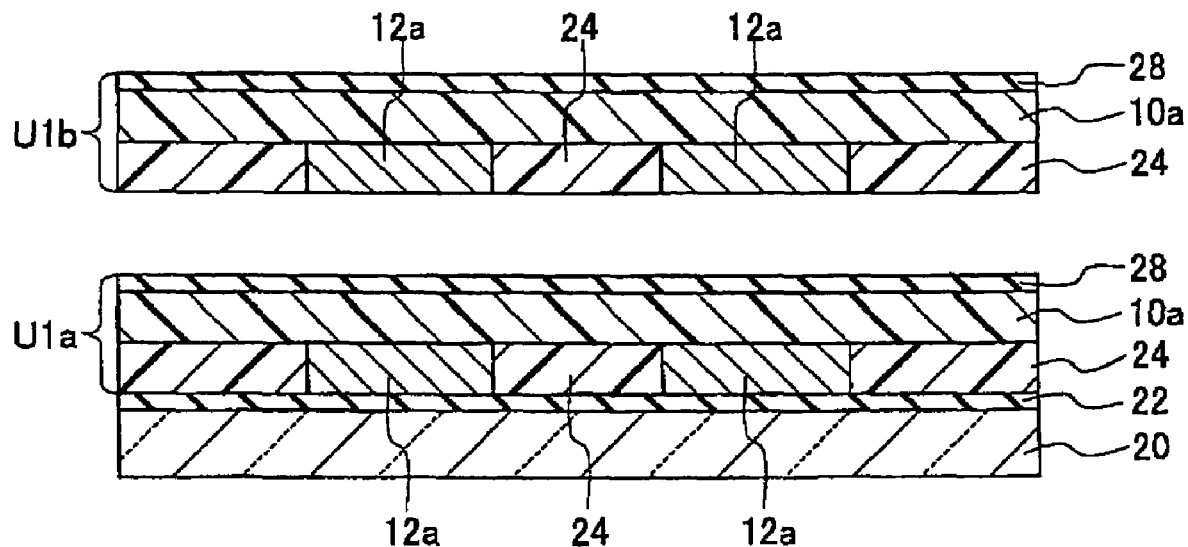
FIG. 4A, FIG. 4B, FIG. 5A, and FIG. 5B are cross-sectional views of principal parts showing a method of stacking green sheets having electrode layers according to an embodiment of the present invention.

First, as shown in FIG. 4A, the above prepared laminate units U1a and other laminate units U1b prepared by the same method as the laminate unit U1a are prepared.

Next, the carrier sheet 20 is peeled off a laminate unit U1b to be a state where the laminate unit U1b has the carrier sheet 20 peeled off. In the present embodiment, the laminate unit U1b is formed on the carrier sheet 20 via the release layer 22, so the carrier sheet 20 can be easily and excellently peeled off the laminate unit U1b. Further, at the time of peeling, the electrode layer 12a and the blank pattern layer 24 will not be damaged. Further, the release layer 22 is preferably peeled off from the laminate unit U1b together with the carrier sheet 20, but may remain on the laminate unit U1b side without problem so long as to a small extent. In this case as well, in the present embodiment, since the thickness of the release layer 22 is made a thin one of 0.1 μm or less or sufficiently thin compared with the green sheet 10a and the electrode layer 12a, the effect can be reduced. Further, the dielectric substance contained in the release layer 22 forms part of the dielectric layer 10 after firing in the same way as the green sheet 10a, so does not cause problems such as a change in composition.

Figure 4B:
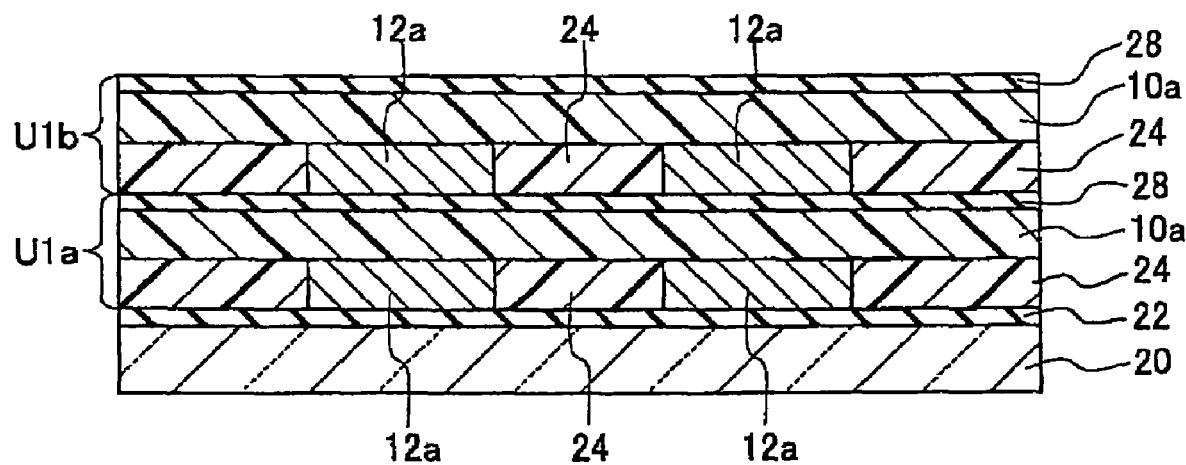

Next, as shown in FIG. 4B, the laminate unit U1b from which the carrier sheet 20 has been peeled off and the laminate unit U1a are adhered and stacked via the adhesive layer 28 of the laminate unit U1a.

Figure 5A:
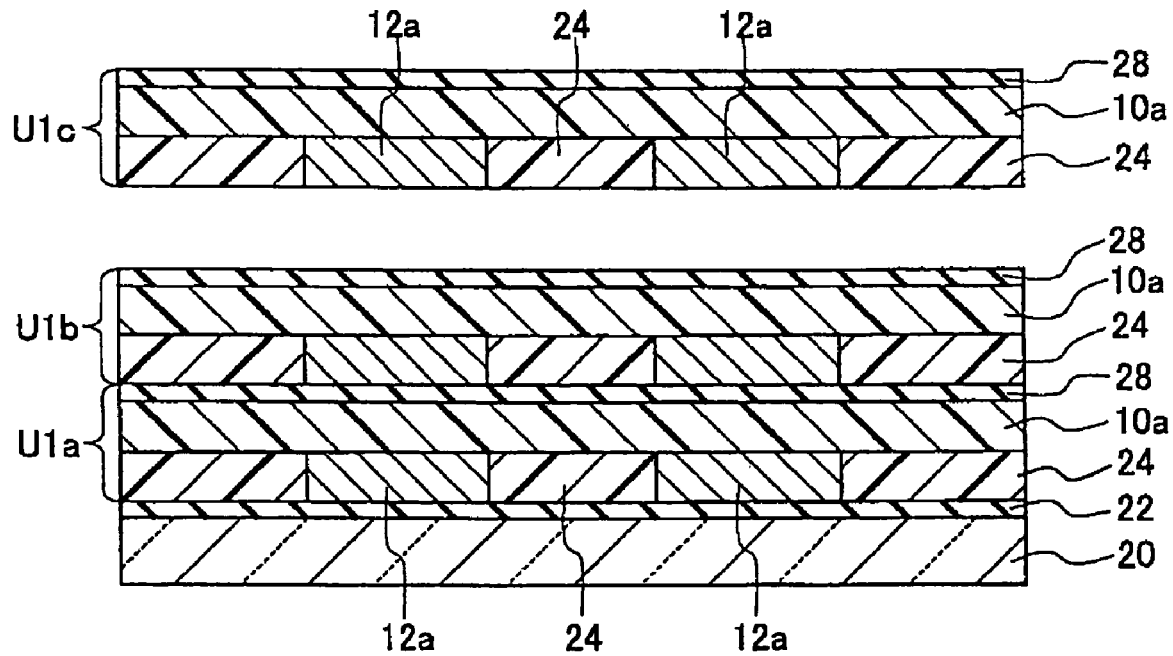
Figure 5B:
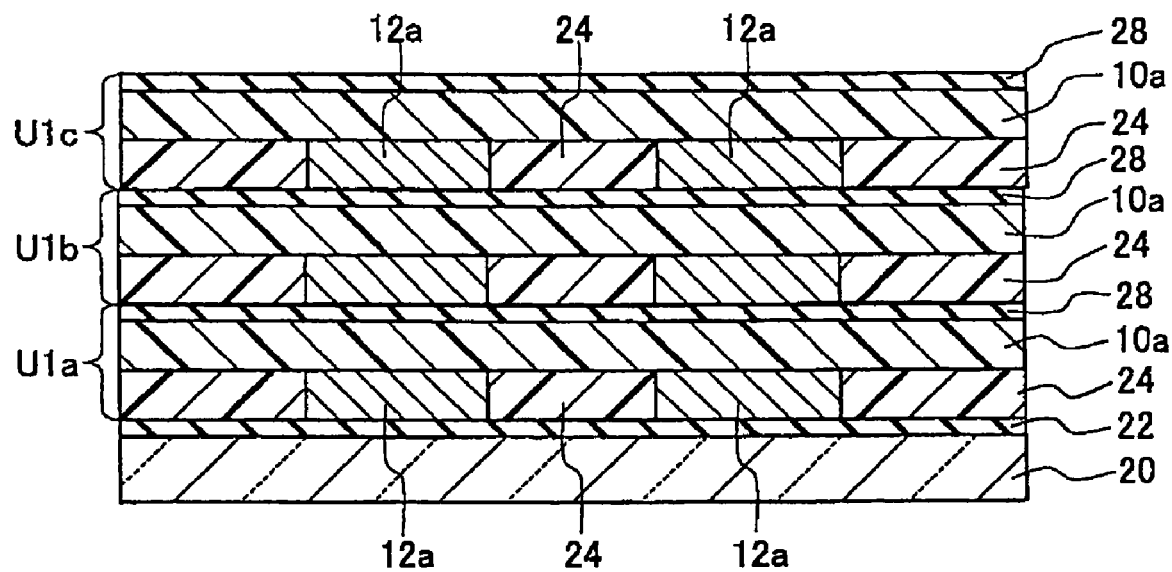

Next, as shown in FIG. 5A and FIG. 5B, in the same way, another laminate unit U1c is adhered and stacked on the laminate unit U1b via the adhesive layer 28 of the laminate unit U1b. The steps shown in FIG. 5A and FIG. 5B are repeated to stack a plurality of laminate units.

Finally, an external layer green sheet is stacked on the top surface and/or bottom surface of this laminate and a final pressing operation performed, then the laminate is cut into a predetermined size to form a green chip. Further, the pressure at the time of the final pressing operation is preferably made 10 to 200 MPa, while the heating temperature is preferably made 40 to 100° C.

Firing of Green Chip Etc.

(8) The obtained green chip is treated to remove the binder, fired, and, as needed, heat treated to cause the dielectric layer to reoxidize. Further, the capacitor body 4 comprised of the formed sintered body is printed or transferred with an external electrode paste and fired to form the external electrodes 6, 8 and produce a multilayer ceramic capacitor 2. The produced multilayer ceramic capacitor 2 is mounted on a printed circuit board by soldering etc. and used for various types of electronic apparatuses etc.

Above, an embodiment of the present invention was explained, but the present invention is not limited to the above embodiment in any way and can be modified in various ways within the scope of the gist of the present invention.

For example, the method of the present invention is not limited to the method of production of a multilayer ceramic capacitor and can also be applied as a method of production of another multilayer type electronic device.

The method of formation of the adhesive layer 28 is not limited to the transfer method. Rather than coating the adhesive layer paste on the surface of the second supporting sheet constituted by the carrier sheet 26, it is also possible to directly coat it on the green sheet 10a and then dry it to form the adhesive layer 28.

Figure 6A:
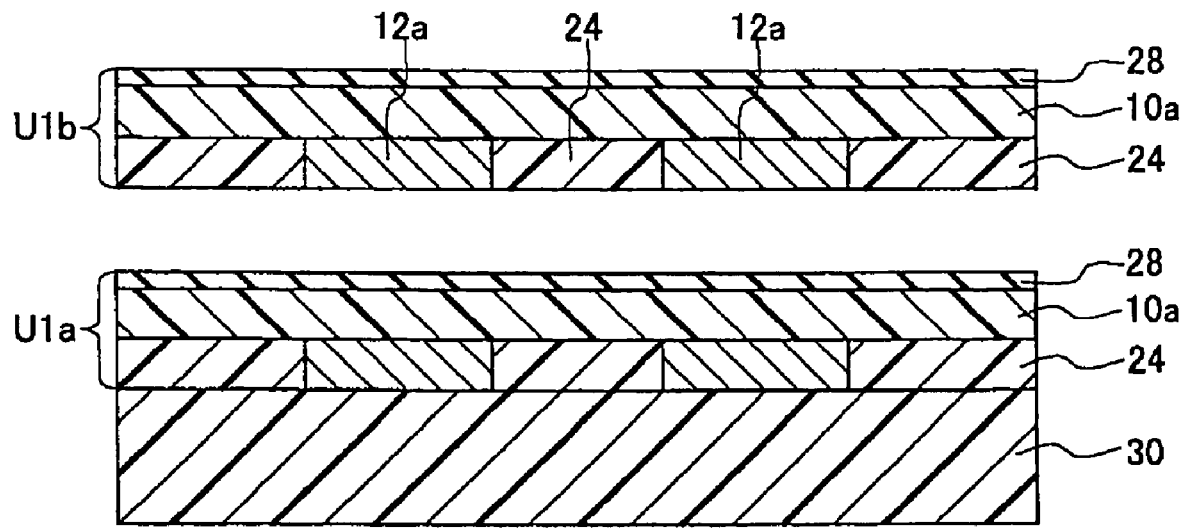
FIG. 6A and FIG. 6B are cross-sectional views of principal parts showing a method of stacking green sheets having electrode layers according to another embodiment of the present invention.
Figure 6B:
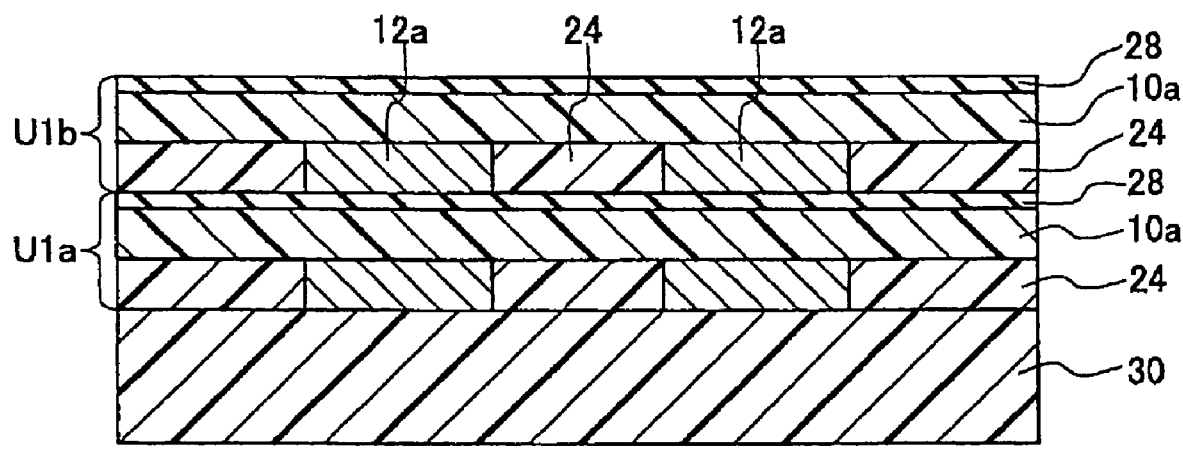

The method of stacking the laminate units, as shown in FIG. 6, may also comprise peeling off the carrier sheets 20 from the laminate units U1a in advance and then stacking the laminate units U1a on an external layer green sheet 30 (thick stack comprised of plurality of stacked green sheets on which electrode layers are not formed).

Figure 7A:
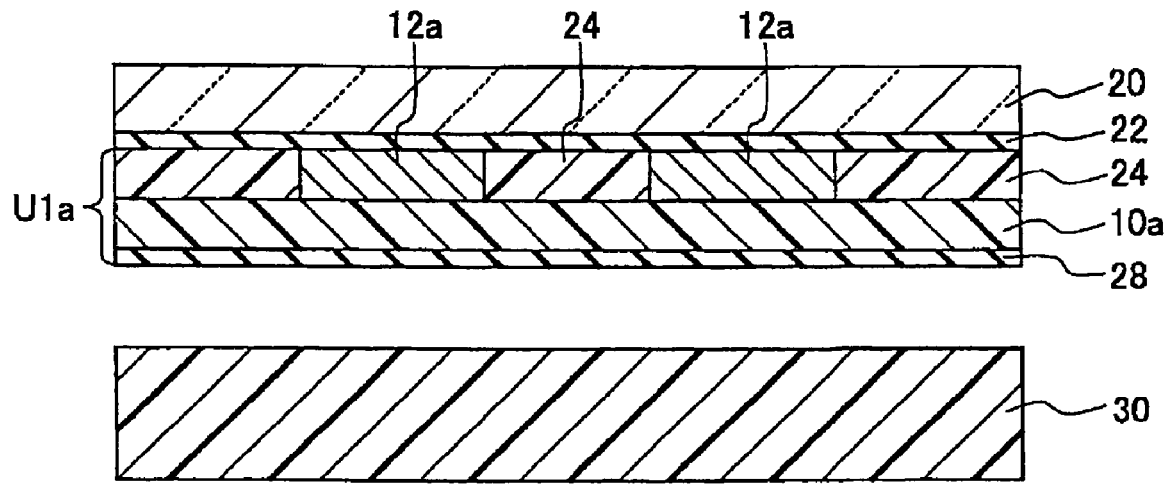
FIG. 7A to FIG. 7C and FIG. 8A to FIG. 8C are cross-sectional views of principal parts showing a method of stacking green sheets having electrode layers according to another embodiment of the present invention.
Figure 7B:
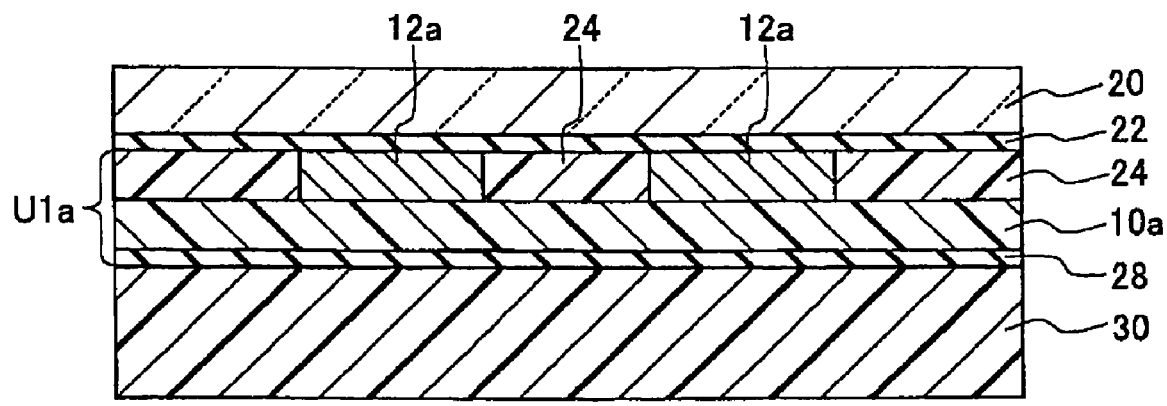
Figure 7C:
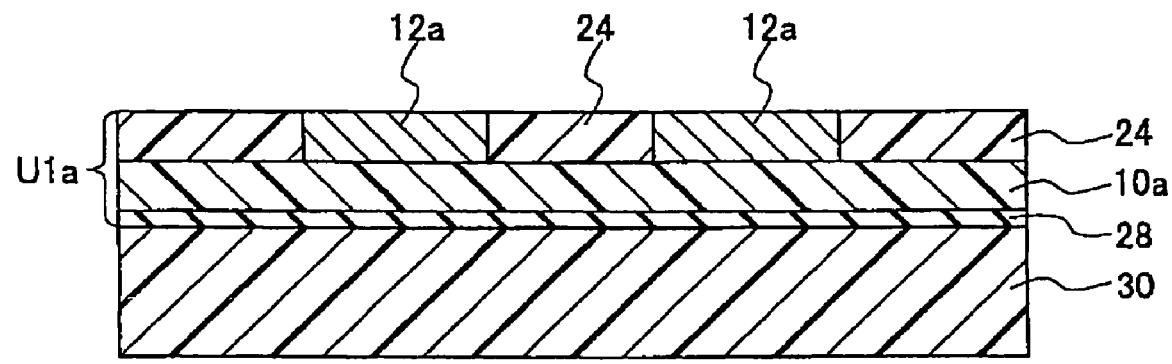
Figure 8A:
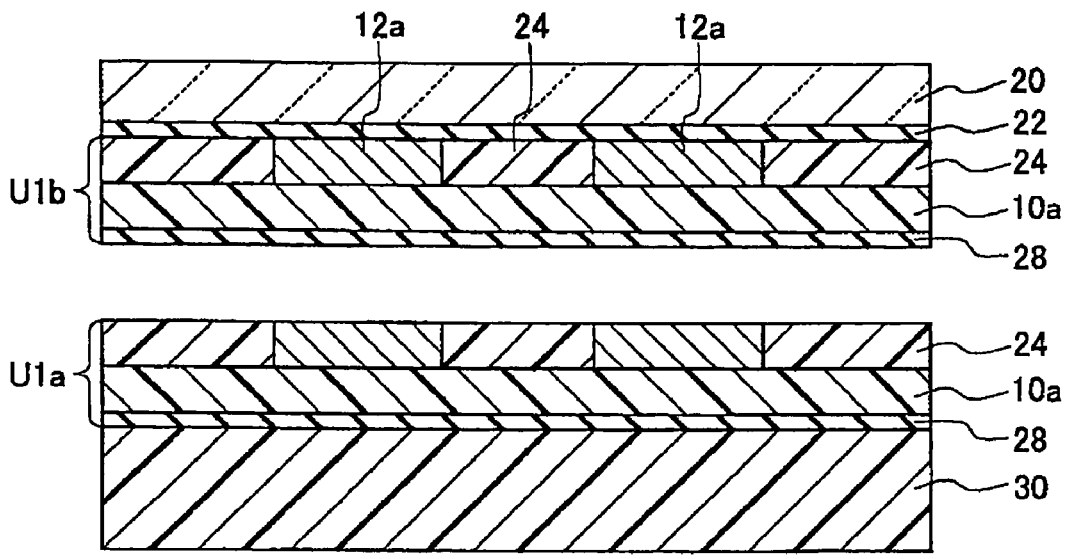
Figure 8B:
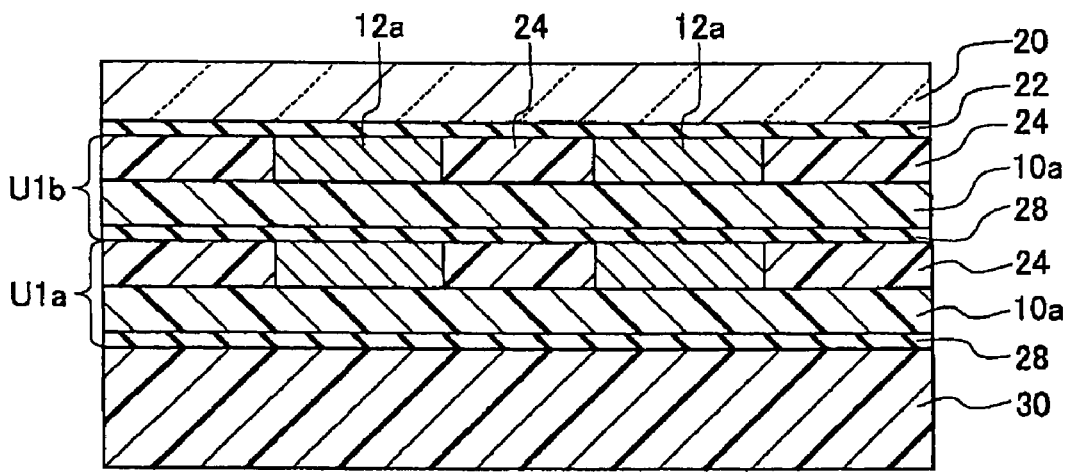
Figure 8C:
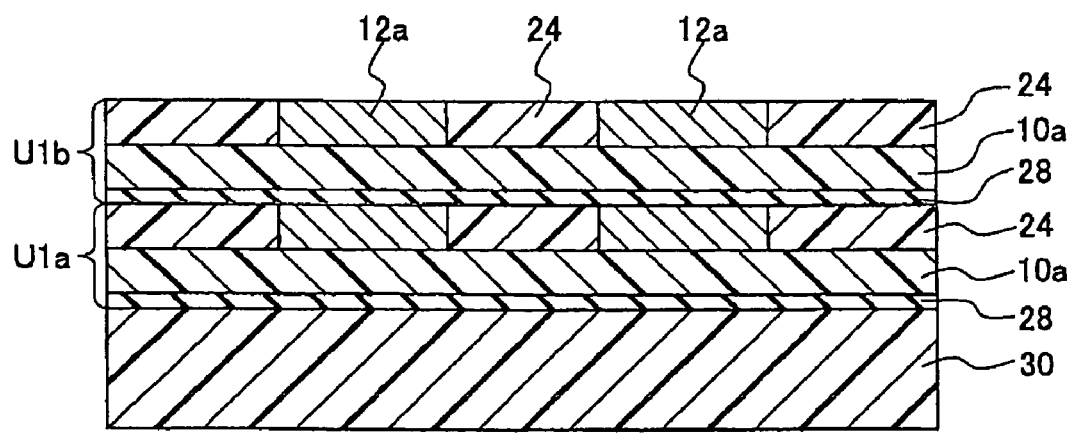

Further, the method of stacking the laminate units, for example as shown in FIG. 7A to FIG. 8C, may also comprise stacking each laminate unit, then peeling off the carrier sheet 20. That is, as shown in FIG. 7A, FIG. 7B, first, the external layer green sheet 30 is overlaid with a laminate unit U1a from which the carrier sheet 20 has not been peeled off and is adhered and stacked with it through the adhesive layer 28. Next, as shown in FIG. 7C, the carrier sheet 20 is peeled off the laminate unit U1a. Next, as shown in FIG. 8A to FIG. 8C, the same procedure is used to adhere and stack on the laminate unit U1a another laminate unit U1b through the adhesive layer 28 of the laminate unit U1b. The process shown in FIG. 8A to FIG. 8C is then repeated to stack a plurality of laminate units. Next, the top of the stack is covered with another external layer green sheet and finally pressed. After this, the stack may be cut to a predetermined size to form a green chip. Further, when employing the process shown in FIG. 7A to FIG. 8C, it is possible to make the adhering strength of the adhesive layer 28 stronger than the tackiness of the release layer 22 so as to selectively and easily peel off the carrier sheet 20, so this is particularly effective.

EXAMPLES

Below, the present invention will be explained further based on detailed examples, but the present invention is not limited to these examples.

Example 1

Preparation of Release Layer Paste
Preparation of Additive Slurry

First, as the additive (subcomponent) materials, (Ba,Ca)SiO$_3$ in an amount of 1.48 parts by weight, Y$_2$O$_3$ in 1.01 parts by weight, MgCO$_3$ in 0.72 part by weight, MnO in 0.13 part by weight, and V$_2$O$_5$ in 0.045 part by weight were prepared. Next, the prepared additive (subcomponent) materials were mixed to obtain the additive (subcomponent) material mixture.

Next, the additive material mixture in an amount of 8.75 parts by weight was mixed and pulverized with ethyl alcohol in 6.21 parts by weight, n-propanol in 6.21 parts by weight, xylene in 2.19 parts by weight, and a polyethylene glycol-based dispersion agent in 0.09 part by weight using a ball mill to obtain an additive slurry. The mixing and pulverization were performed using a 250 cc polyethylene resin vessel charged with 450 g of 2 mmφ ZrO$_2$ media at a peripheral speed of 45 m/min for 20 hours. The pulverized additive material had a particle size (a median size) of about 0.1 μm.

Preparation of Primary Slurry

Next, the entire amount of the obtained additive slurry, BaTiO$_3$ powder of an average particle size of 0.1 μm (BT-005/Sakai Chemical Industry) in an amount of 200 parts by weight, ethyl alcohol in 42.40 parts by weight, n-propanol in 42.40 parts by weight, xylene in 44.77 parts by weight, a plasticizer constituted by dioctyl phthalate (DOP) in 3.13 parts by weight, a mineral spirit in 14.61 parts by weight, and a polyethyleneglycol-based dispersion agent in 2.0 parts by weight were mixed and pulverized using a ball mill. The mixing and pulverization were conducted using a 1 liter polyethylene resin vessel charged with 18 g of 2 mmφ ZrO$_2$ media at a peripheral speed of 45 m/min for 4 hours.

After this (after mixing for 4 hours), a binder lacquer A prepared by dissolving polyvinyl acetal by ethyl alcohol:n-propanol=1:1' (polyvinyl acetal in a resin solids concentration of 7%) was additionally added in an amount of 85.7 parts by weight and the result further mixed for 16 hours by a ball mill to obtain a primary slurry.

The polyvinyl acetal used was one having a polymerization degree of 2400, an acetalization degree of 66 mol %, and an amount of residual acetyl groups of 3 mol %. The 85.7 parts by weight of the amount of the binder lacquer A added is the amount by which the amount of addition of the polyvinyl acetal itself becomes 6 wt % with respect to the ceramic powder. The obtained primary slurry had a concentration of nonvolatile ingredients of 40.28%.

Note that, in this example, the above $BaTiO_3$ powder and the additive material mixture were used as the ceramic powder (average particle size 0.05 μm, specific surface area 20 $m^2/g$).

Dilution of Primary Slurry

In this example, a high pressure dispersed and low concentration slurry is difficult to produce by a single process, so first a relatively high concentration primary slurry is produced, then this primary slurry is diluted to produce the release layer paste.

Specifically, the entire amount of the obtained primary slurry is mixed with the following prepared binder lacquer B using a ball mill to give a total amount of addition of the polyvinyl acetal 24 parts by weight and a concentration of nonvolatile ingredients of 10%. The mixing was performed using a 10 liter polyethylene resin vessel charged with 18 g of 2 mmφ $ZrO_2$ media at a peripheral speed of 45 m/min for 4 hours.

The binder lacquer B was prepared by preparing and mixing ethyl alcohol in an amount of 710.3 parts by weight, n-propanol in 710.3 parts by weight, xylene in 250.7 parts by weight, a plasticizer constituted by dioctyl phthalate (DOP) in 21.92 parts by weight, and the binder lacquer A used for production of the primary slurry in 43.84 parts by weight.

The mixed slurry had a concentration of nonvolatile ingredients of 10%, an amount of polyvinyl acetal with respect to 100 parts by weight of the ceramic powder of 24 parts by weight, a content of the plasticizer with respect to 100 parts by weight of the polyvinyl acetal of 50 parts by weight (12 parts by weight with respect to 100 parts by weight of the ceramic powder), and a ratio (P/B) of the ceramic powder with respect to the polyvinyl acetal and plasticizer of 2.78.

High Pressure Dispersion Treatment

The obtained mixed slurry was treated using a wet jet mill (Sugino Machine HJP-25005) so as to prepare a release layer paste. The treatment conditions were a pressure of 100 MPa. The treatment was performed once.

Formation of Release Layer

The prepared release layer paste was coated by a bar coater (#2) at a coating rate of 4/min on the surface of a 38 μm thick PET film (first supporting sheet) treated for release (peeling strength: 10.5 mN/cm) by coating its surface with a release agent mainly comprised of silicone, then was dried in a drying oven with an oven temperature of 60° C. for 1 minute so as to form a release layer with a dry thickness of 0.1 μm.

Evaluation of Release Layer

First, electrode layer paste and blank pattern layer paste used for evaluation of the release layer were prepared.

The electrode layer paste was prepared by mixing a binder comprised of ethyl cellulose, a solvent, and Ni powder.

The blank pattern layer paste was prepared by mixing a binder comprised of ethyl cellulose, a solvent, and $BaTiO_3$ powder.

In this example, as the solvents included in the electrode layer paste and blank pattern layer paste, the solvents shown in Table 1 were used (Sample Nos. 1 to 14 shown in Table 1).

Further, the above prepared electrode layer paste and blank pattern layer paste were used by the following methods to evaluate the existence of occurrence of bleedout, shedding, and pinholes, the existence of sheet attack, and the peelability of the electrode layer and blank pattern layer.

Bleedout, Shedding, and Pinholes

The existence of occurrence of bleedout, shedding, and pinholes was confirmed by printing the surface of a release layer with electrode layer paste and blank pattern layer paste and visually examining the electrode layer and blank pattern layer formed on the surface of the release layer.

Specifically, first, the electrode layer paste prepared above was printed by a screen printing machine to give an amount of deposition of Ni metal of 0.55 $mg/cm^2$, then was dried at 90° C. for 2 minutes to form a 1 μm thick predetermined pattern of an electrode layer 12a.

Next, the parts of the surface of the release layer on which the electrode layer 12a was not formed was printed by the above prepared blank pattern layer paste by a screen printer to give an amount of deposition of $BaTiO_3$ of 0.43 $mg/cm^2$, then was dried at 90° C. for 2 minutes to form a blank pattern.

The blank pattern was printed using a screen printing plate with a pattern complementary to the pattern used when printing the electrode layer paste. The blank pattern was formed to have a dry thickness the same as the thickness of the electrode layer.

After this, the electrode layer and blank pattern layer formed on the surface of the release layer were visually examined for bleedout, shedding, and pinholes. The case where no bleedout, shedding, and pinholes of the electrode layer and blank pattern layer could be observed was judged as "G (good)" and the case where one or more of the same could be confirmed as "P (poor)". The results are shown in Table 1.

Sheet Attack

The release layer was evaluated for sheet attack by printing the above prepared electrode layer paste and blank pattern layer paste under similar conditions as the above evaluation of bleedout, shedding, and pinholes so as to form an electrode layer and blank pattern layer, then examining the surface of the release layer opposite to the electrode layer and blank pattern layer (surface contacting PET film) by using microscope and checking for the degree of dissolution of the release layer by the degree of deformation and color. The case where no dissolution of the release layer could be confirmed was judged as "G (good)" and the case where it could be confirmed as "P (poor)". The results are shown in Table 1.

Peelability of Electrode Layer and Blank Pattern Layer

The peelability of the electrode layer and blank pattern layer from the release layer was evaluated by printing the above prepared electrode layer paste and blank pattern layer paste on the surface of the release layer under similar conditions as the above evaluation of bleedout, shedding, and pinholes to form an electrode layer and blank pattern layer, then measuring the peeling strength when peeling off the electrode layer and blank pattern layer from the release layer.

Specifically, for example, a sheet in the state shown in FIG. 2B was attached to a sample table using two-sided adhesive tape (Scotch ST-416) so that the PET film (corresponding to the carrier sheet 20 in FIG. 2B) faces upward, then one end of the PET film was pulled up in a direction of 90 degrees with respect to the plane of the sheet at a speed of 8 mm/min. The force acting on the PET film carrier sheet 20 at that time (mN/cm) was measured as the peeling strength of the electrode layer and blank pattern layer (90 degree peeling test method).

By lowering the peeling strength, it is possible to facilitate peeling of the electrode layer and blank pattern layer from the PET film. Further, since damage to the electrode layer and blank pattern layer at the time of peeling can also be effectively prevented, the peeling strength should be low. On the other hand, if the peeling strength is lower than the peeling strength at the time of transfer to the later explained adhesive layer or green sheet, transfer to the adhesive layer or green sheet becomes difficult. Therefore, in this example, 10 mN/cm or more was deemed good. On the other hand, if the peeling strength is too high, peeling off the PET film from the electrode layer and blank pattern layer at the time of stacking becomes difficult. Therefore, in this example, 20 mN/cm or less was deemed good. The results are shown in Table 1.

TABLE 1

Table 1

| Sample | | Type of solvent of electrode layer paste and blank paste | Type of resin | Release layer | | | | | Electrode layer and blank pattern layer peeling strength (mN/cm) |
| | | | | Average particle size of ceramic powder (μm) | Specific surface area of ceramic powder ($m^2/g$) | Dry thickness (μm) | Sheet attack | Bleedout, shedding, and pinholes | |
| --- | --- | --- | --- | --- | --- | --- | --- | --- | --- |
| 1 | Ex. | Limonene | Polyvinyl acetal | 0.05 | 20 | 0.1 | Good | Good | 15 |
| 2 | Ex. | Dihydroterpinyl methyl ether | Polyvinyl acetal | 0.05 | 20 | 0.1 | Good | Good | 13.5 |
| 3 | Ex. | α-terpinyl acetate | Polyvinyl acetal | 0.05 | 20 | 0.1 | Good | Good | 14 |
| 4 | Ex. | Terpinyl methyl ether | Polyvinyl acetal | 0.05 | 20 | 0.1 | Good | Good | 14 |
| 5 | Ex. | Isobornyl acetate | Polyvinyl acetal | 0.05 | 20 | 0.1 | Good | Good | 15.5 |
| 6 | Ex. | Caryophyllene | Polyvinyl acetal | 0.05 | 20 | 0.1 | Good | Good | 13.5 |
| 7 | Ex. | 1-dihydrocarvyl acetate | Polyvinyl acetal | 0.05 | 20 | 0.1 | Good | Good | 15 |
| 8 | Ex. | Menthone | Polyvinyl acetal | 0.05 | 20 | 0.1 | Good | Good | 14.5 |
| 9 | Ex. | Menthyl acetate | Polyvinyl acetal | 0.05 | 20 | 0.1 | Good | Good | 13.5 |
| 10 | Ex. | Perillyl acetate | Polyvinyl acetal | 0.05 | 20 | 0.1 | Good | Good | 16 |
| 11 | Ex. | Carvyl acetate | Polyvinyl acetal | 0.05 | 20 | 0.1 | Good | Good | 14.5 |
| 12 | Ex. | d-dihydrocarvyl acetate | Polyvinyl acetal | 0.05 | 20 | 0.1 | Good | Good | 14 |
| 13 | Ex. | Butyl carbitol acetate | Polyvinyl acetal | 0.05 | 20 | 0.1 | Good | Good | 15 |
| 14 | Comp. Ex. | Terpineol | Polyvinyl acetal | 0.05 | 20 | 0.1 | Poor | Good | 21.5 |

In Table 1, the amount of the polyvinyl acetal was made 24 parts by weight and the plasticizer 12 parts by weight with respect to 100 parts by weight of the ceramic powder and P/B was made 2.78. Further, as the polyvinyl acetal, one having a polymerization degree of 2400, an acetalization degree of 66 mol %, and an amount of residual acetal groups of 3 mol % was used. The same is true below in Tables 2 to 4 and 9.

Table 1 shows the results of evaluation of release layers using a binder comprised of polyvinyl acetal and a ceramic powder comprised of a powder with an average particle size of 0.05 μm and a specific surface area of 20 $m^2/g$ and reduced in dry thickness to 0.1 μm (Sample Nos. 1 to 14). Note that Sample Nos. 1 to 14 of Table 1 are samples using the solvents shown in Table 1 for the electrode layer paste and blank pattern layer paste used for evaluation of the release layer.

From the results of Sample Nos. 1 to 13 of Table 1, it could be confirmed that a release layer formed using a binder comprised of the predetermined polyvinyl acetal of the present invention can give good results by use together with the electrode layer paste and blank pattern layer paste prepared using the predetermined solvent of the present invention even when made a thin layer of a dry thickness of 0.1 μm.

On the other hand, when making the solvent contained in the electrode layer paste and blank pattern layer paste terpineol, sheet attack occurred and the peelability of the electrode layer and blank pattern layer deteriorated.

Example 2

Except for making the dry thickness of the release layer 0.07 μm, the same procedure was followed as in Example 1 to form and evaluate the release layer. The results are shown in Table 2.

Example 3

Except for making the dry thickness of the release layer 0.05 μm, the same procedure was followed as in Example 1 to form and evaluate the release layer. The results are shown in Table 3.

Comparative Example 1

Except for making the dry thickness of the release layer 0.2 μm, the same procedure was followed as in Example 1 to form and evaluate the release layer. The results are shown in Table 4.

TABLE 2

Table 2

| Sample | | Type of solvent of electrode layer paste and blank paste | Type of resin | Release layer | | | | | Electrode layer and blank pattern layer peeling strength (mN/cm) |
| | | | | Average particle size of ceramic powder (μm) | Specific surface area of ceramic powder ($m^2/g$) | Dry thickness (μm) | Sheet attack | Bleedout, shedding, and pinholes | |
| --- | --- | --- | --- | --- | --- | --- | --- | --- | --- |
| 21 | Ex. | Limonene | Polyvinyl acetal | 0.05 | 20 | 0.07 | Good | Good | 15.5 |
| 22 | Ex. | Dihydroterpinyl methyl ether | Polyvinyl acetal | 0.05 | 20 | 0.07 | Good | Good | 14 |
| 23 | Ex. | α-terpinyl acetate | Polyvinyl acetal | 0.05 | 20 | 0.07 | Good | Good | 16 |
| 24 | Ex. | Terpinyl methyl ether | Polyvinyl acetal | 0.05 | 20 | 0.07 | Good | Good | 14.5 |
| 25 | Ex. | Isobornyl acetate | Polyvinyl acetal | 0.05 | 20 | 0.07 | Good | Good | 14.5 |
| 26 | Ex. | Caryophyllene | Polyvinyl acetal | 0.05 | 20 | 0.07 | Good | Good | 16 |
| 27 | Ex. | 1-dihydrocarvyl acetate | Polyvinyl acetal | 0.05 | 20 | 0.07 | Good | Good | 15 |
| 28 | Ex. | Menthone | Polyvinyl acetal | 0.05 | 20 | 0.07 | Good | Good | 18.5 |

TABLE 2-continued

Table 2

| Sample | | Type of solvent of electrode layer paste and blank paste | Release layer | | | | Sheet attack | Bleedout, shedding, and pinholes | Electrode layer and blank pattern layer peeling strength (mN/cm) |
| | | | Type of resin | Average particle size of ceramic powder (μm) | Specific surface area of ceramic powder (m²/g) | Dry thickness (μm) | | | |
|---|---|---|---|---|---|---|---|---|---|
| 29 | Ex. | Menthyl acetate | Polyvinyl acetal | 0.05 | 20 | 0.07 | Good | Good | 14 |
| 30 | Ex. | Perillyl acetate | Polyvinyl acetal | 0.05 | 20 | 0.07 | Good | Good | 15.5 |
| 31 | Ex. | Carvyl acetate | Polyvinyl acetal | 0.05 | 20 | 0.07 | Good | Good | 13.5 |
| 32 | Ex. | d-dihydrocarvyl acetate | Polyvinyl acetal | 0.05 | 20 | 0.07 | Good | Good | 16 |
| 33 | Ex. | Butyl carbitol acetate | Polyvinyl acetal | 0.05 | 20 | 0.07 | Good | Good | 14.5 |
| 34 | Comp. Ex. | Terpineol | Polyvinyl acetal | 0.05 | 20 | 0.07 | Poor | Poor | 25 |

TABLE 3

Table 3

| Sample | | Type of solvent of electrode layer paste and blank paste | Release layer | | | | Sheet attack | Bleedout, shedding, and pinholes | Electrode layer and blank pattern layer peeling strength (mN/cm) |
| | | | Type of resin | Average particle size of ceramic powder (μm) | Specific surface area of ceramic powder (m²/g) | Dry thickness (μm) | | | |
|---|---|---|---|---|---|---|---|---|---|
| 41 | Ex. | Limonene | Polyvinyl acetal | 0.05 | 20 | 0.05 | Good | Good | 15.5 |
| 42 | Ex. | Dihydroterpinyl methyl ether | Polyvinyl acetal | 0.05 | 20 | 0.05 | Good | Good | 15 |
| 43 | Ex. | α-terpinyl acetate | Polyvinyl acetal | 0.05 | 20 | 0.05 | Good | Good | 17 |
| 44 | Ex. | Terpinyl methyl ether | Polyvinyl acetal | 0.05 | 20 | 0.05 | Good | Good | 15.5 |
| 45 | Ex. | Isobornyl acetate | Polyvinyl acetal | 0.05 | 20 | 0.05 | Good | Good | 14 |
| 46 | Ex. | Caryophyllene | Polyvinyl acetal | 0.05 | 20 | 0.05 | Good | Good | 16 |
| 47 | Ex. | 1-dihydrocarvyl acetate | Polyvinyl acetal | 0.05 | 20 | 0.05 | Good | Good | 15.5 |
| 48 | Ex. | Menthone | Polyvinyl acetal | 0.05 | 20 | 0.05 | Good | Good | 15.5 |
| 49 | Ex. | Menthyl acetate | Polyvinyl acetal | 0.05 | 20 | 0.05 | Good | Good | 14 |
| 50 | Ex. | Perillyl acetate | Polyvinyl acetal | 0.05 | 20 | 0.05 | Good | Good | 15 |
| 51 | Ex. | Carvyl acetate | Polyvinyl acetal | 0.05 | 20 | 0.05 | Good | Good | 16.5 |
| 52 | Ex. | d-dihydrocarvyl acetate | Polyvinyl acetal | 0.05 | 20 | 0.05 | Good | Good | 14 |
| 53 | Ex. | Butyl carbitol acetate | Polyvinyl acetal | 0.05 | 20 | 0.05 | Good | Good | 17 |
| 54 | Comp. Ex. | Terpineol | Polyvinyl acetal | 0.05 | 20 | 0.05 | Poor | Poor | 28.5 |

TABLE 4

Table 4

| Sample | | Type of solvent of electrode layer paste and blank paste | Release layer | | | | Sheet attack | Bleedout, shedding, and pinholes | Electrode layer and blank pattern layer peeling strength (mN/cm) |
| | | | Type of resin | Average particle size of ceramic powder (μm) | Specific surface area of ceramic powder (m²/g) | Dry thickness (μm) | | | |
|---|---|---|---|---|---|---|---|---|---|
| 61 | Comp. Ex. | Limonene | Polyvinyl acetal | 0.05 | 20 | 0.2 | Good | Good | 14.5 |
| 62 | Comp. Ex. | Dihydroterpinyl methyl ether | Polyvinyl acetal | 0.05 | 20 | 0.2 | Good | Good | 14.5 |
| 63 | Comp. Ex. | α-terpinyl acetate | Polyvinyl acetal | 0.05 | 20 | 0.2 | Good | Good | 15 |
| 64 | Comp. Ex. | Terpinyl methyl ether | Polyvinyl acetal | 0.05 | 20 | 0.2 | Good | Good | 14 |
| 65 | Comp. Ex. | Isobornyl acetate | Polyvinyl acetal | 0.05 | 20 | 0.2 | Good | Good | 15 |
| 66 | Comp. Ex. | Caryophyllene | Polyvinyl acetal | 0.05 | 20 | 0.2 | Good | Good | 15.5 |
| 67 | Comp. Ex. | 1-dihydrocarvyl acetate | Polyvinyl acetal | 0.05 | 20 | 0.2 | Good | Good | 14 |
| 68 | Comp. Ex. | Menthone | Polyvinyl acetal | 0.05 | 20 | 0.2 | Good | Good | 15 |
| 69 | Comp. Ex. | Menthyl acetate | Polyvinyl acetal | 0.05 | 20 | 0.2 | Good | Good | 14 |
| 70 | Comp. Ex. | Perillyl acetate | Polyvinyl acetal | 0.05 | 20 | 0.2 | Good | Good | 16 |
| 71 | Comp. Ex. | Carvyl acetate | Polyvinyl acetal | 0.05 | 20 | 0.2 | Good | Good | 16.5 |
| 72 | Comp. Ex. | d-dihydrocarvyl acetate | Polyvinyl acetal | 0.05 | 20 | 0.2 | Good | Good | 15 |
| 73 | Comp. Ex. | Butyl carbitol acetate | Polyvinyl acetal | 0.05 | 20 | 0.2 | Good | Good | 14.5 |
| 74 | Comp. Ex. | Terpineol | Polyvinyl acetal | 0.05 | 20 | 0.2 | Good | Good | 16 |

As shown in Tables 2 and 3, even when making the dry thickness of the release layer a further thinner 0.07 μm or 0.05 μm, results similar to Example 1 can be obtained.

Note that as shown in Table 4, when making the dry thickness of the release layer a relatively thick 0.2 μm, even if making the solvent included in the electrode layer paste and blank pattern layer paste just terpineol, use was possible with no particular problem (Sample No. 74). However, if making the dry thickness a thick 0.2 μm, the dielectric characteristics end up deteriorating (see later Example 6).

Comparative Example 2

The polyvinyl acetal of Example 1 was changed to polyvinyl butyral (PVB) to prepare a release layer paste. Specifically, the procedure was as follows.

Preparation of Release Layer Paste
Preparation of Additive Slurry

First, an additive (subcomponent) material mixture of the same composition as in Example 1 was prepared.

Next, the additive material mixture in an amount of 4.3 parts by weight, ethyl alcohol in 3.1 parts by weight, n-propanol in 3.1 parts by weight, xylene in 1.1 parts by weight, and a polyethylene glycol-based dispersion agent in 0.04 part by weight were mixed and pulverized using a ball mill to obtain an additive slurry. The mixing and pulverization were performed using a 250 cc polyethylene resin vessel charged with 450 g of 2 mmϕ $ZrO_2$ media at a peripheral speed of 45 m/min for 20 hours. The pulverized additive material had a particle size of a median size of about 0.1 μm.

Preparation of Primary Slurry

Next, the entire amount of the obtained additive slurry, $BaTiO_3$ powder of an average particle size of 0.1 μm (BT-005/Sakai Chemical Industry) in an amount of 100 parts by weight, ethyl alcohol in 45.88 parts by weight, n-propanol in 45.88 parts by weight, xylene in 22.4 parts by weight, a dioctyl phthalate (DOP) plasticizer in 3.03 parts by weight, a mineral spirit in 7.31 parts by weight, and a polyethylene glycol-based dispersion agent in 1.0 part by weight were mixed and pulverized using a ball mill. The mixing and pulverization were performed using a 1 liter polyethylene resin vessel charged with 18 g of 2 mmϕ $ZrO_2$ media under conditions of a peripheral speed of 45 m/min for 4 hours.

After this (after mixing for 4 hours), a 15% resin solid concentration lacquer comprised of a polyvinyl butyral (PVB) resin (polymerization degree of 1450, butyralization degree of 69%, amount of residual acetyl groups of 12%) dissolved in ethyl alcohol:n-propanol=1:1 was additionally added in an amount of 41.6 parts by weight (added to give amount of addition of polyvinyl butyral resin, with respect to powder (barium titanate+additive), of 6 wt %) and the mixture was further mixed for 16 hours by a ball mill to obtain a primary slurry. The obtained primary slurry had a nonvolatile concentration of 41.3 wt %.

Note that, in this comparative example as well, the above the $BaTiO_3$ powder and the additive material mixture were used as the ceramic powder (average particle size 0.05 μm, specific surface area 20 $m^2$/g).

Dilution of Primary Slurry

In this example, a high pressure dispersed and low concentration slurry is difficult to produce by a single process, so first a relatively high concentration primary slurry is produced, then this primary slurry is diluted to produce the release layer paste.

Specifically, the entire amount of the obtained primary slurry is mixed with the following binder lacquer using a ball mill to give a total amount of the prepared polyvinyl butyral resin added of 9 parts by weight and a concentration of nonvolatile ingredients of 15%. The mixing was performed using a 3 liter polyethylene resin vessel at a peripheral speed of 45 m/min for 4 hours. Note that the binder lacquer was prepared by preparing ethyl alcohol in an amount of 244.81 parts by weight, n-propanol in 244.81 parts by weight, xylene in 131.83 parts by weight, a dioctyl phthalate (DOP) plasticizer in 22.98 parts by weight, and PVB 15% lacquer in 303.34 parts by weight, mixing these, and heating them to dissolve at 50° C.

The mixed slurry had a concentration of nonvolatile ingredients of 15%, an amount of PVB resin with respect to 100 parts by weight of ceramic powder of 50 parts by weight, a content of the plasticizer with respect to 100 parts by weight of the PVB resin of 50 parts by weight (25 parts by weight with respect to 100 parts by weight of ceramic powder), and a ratio (P/B) of the ceramic powder with respect to the PVB and plasticizer of 1.33.

High Pressure Dispersion Treatment

The obtained mixed slurry was treated in the same way as in Example 1 so as to prepare a release layer paste.

Formation of Release Layer

The prepared release layer paste was coated and dried on the surface of the PET film (first supporting sheet) used in Example 1 under similar conditions to form a release layer with a dry thickness of 0.1 μm which was then evaluated in the same way as in Example 1. The results are shown in Table 5.

TABLE 5

Table 5

| Sample | Type of solvent of electrode layer paste and blank paste | Release layer | | | | | | Electrode layer and blank pattern layer peeling strength (mN/cm) |
|---|---|---|---|---|---|---|---|---|
| | | Type of resin | Average particle size of ceramic powder (μm) | Specific surface area of ceramic powder ($m^2$/g) | Dry thickness (μm) | Sheet attack | Bleedout, shedding, and pinholes | |
| 81 | Comp. Ex. Limonene | PVB | 0.05 | 20 | 0.1 | Poor | Poor | 21 |
| 82 | Comp. Ex. Dihydroterpinyl methyl ether | PVB | 0.05 | 20 | 0.1 | Poor | Good | 17.5 |
| 83 | Comp. Ex. α-terpinyl acetate | PVB | 0.05 | 20 | 0.1 | Poor | Good | 19 |
| 84 | Comp. Ex. Terpinyl methyl ether | PVB | 0.05 | 20 | 0.1 | Poor | Good | 15 |
| 85 | Comp. Ex. Isobornyl acetate | PVB | 0.05 | 20 | 0.1 | Poor | Good | 16.5 |
| 86 | Comp. Ex. Caryophyllene | PVB | 0.05 | 20 | 0.1 | Poor | Good | 14.5 |
| 87 | Comp. Ex. 1-dihydrocarvyl acetate | PVB | 0.05 | 20 | 0.1 | Poor | Good | 19.5 |
| 88 | Comp. Ex. Menthone | PVB | 0.05 | 20 | 0.1 | Poor | Poor | 24.5 |
| 89 | Comp. Ex. Menthyl acetate | PVB | 0.05 | 20 | 0.1 | Poor | Good | 20 |

TABLE 5-continued

Table 5

| Sample | Type of solvent of electrode layer paste and blank paste | | Release layer | | | | | Electrode layer and blank pattern layer peeling strength (mN/cm) |
|---|---|---|---|---|---|---|---|---|
| | | Type of resin | Average particle size of ceramic powder (μm) | Specific surface area of ceramic powder (m²/g) | Dry thickness (μm) | Sheet attack | Bleedout, shedding, and pinholes | |
| 90 | Comp. Ex. Perillyl acetate | PVB | 0.05 | 20 | 0.1 | Poor | Good | 17 |
| 91 | Comp. Ex. Carvyl acetate | PVB | 0.05 | 20 | 0.1 | Poor | Good | 15.5 |
| 92 | Comp. Ex. d-dihydrocarvyl acetate | PVB | 0.05 | 20 | 0.1 | Poor | Good | 16 |
| 93 | Comp. Ex. Butyl carbitol acetate | PVB | 0.05 | 20 | 0.1 | Poor | Good | 19 |
| 94 | Comp. Ex. Terpineol | PVB | 0.05 | 20 | 0.1 | Poor | Poor | 23.5 |

In Table 5, the amount of PVB was made 50 parts by weight and the plasticizer 25 parts by weight with respect to 100 parts by weight of ceramic powder and P/B was made 1.33. Further, as the PVB, one having a polymerization degree of 1450, a butyralization degree of 69 mol %, and an amount of residual acetyl groups of 12 mol % was used. The same is true below for Tables 6 to 8.

As shown in Table 5, when using a binder comprised of polyvinyl butyral (PVB) to form the release layer, if making the thickness of the release layer a thin 0.1 μm, sheet attack occurs regardless of the type of the solvent contained in the electrode layer paste and blank pattern layer paste. In particular, in this comparative examples, depending on the type of the solvent contained in the electrode layer paste and blank pattern layer paste, bleedout, shedding, and pinholes ended up occurring in addition to the sheet attack and, further, the peelability of the electrode layer and blank pattern layer deteriorated (Sample Nos. 81, 88, and 94).

Comparative Example 3

Except for making the dry thickness of the release layer 0.07 μm, the same procedure was performed as in Comparative Example 2 to form and evaluate the release layer. The results are shown in Table 6.

Comparative Example 4

Except for making the dry thickness of the release layer 0.05 μm, the same procedure was performed as in Comparative Example 2 to form and evaluate the release layer. The results are shown in Table 7.

Comparative Example 5

Except for making the dry thickness of the release layer 0.2 μm, the same procedure was performed as in Comparative Example 2 to form and evaluate the release layer. The results are shown in Table 8.

TABLE 6

Table 6

| Sample | Type of solvent of electrode layer paste and blank paste | | Release layer | | | | | Electrode layer and blank pattern layer peeling strength (mN/cm) |
|---|---|---|---|---|---|---|---|---|
| | | Type of resin | Average particle size of ceramic powder (μm) | Specific surface area of ceramic powder (m²/g) | Dry thickness (μm) | Sheet attack | Bleedout, shedding, and pinholes | |
| 101 | Comp. Ex. Limonene | PVB | 0.05 | 20 | 0.07 | Poor | Poor | 26 |
| 102 | Comp. Ex. Dihydroterpinyl methyl ether | PVB | 0.05 | 20 | 0.07 | Poor | Good | 19 |
| 103 | Comp. Ex. α-terpinyl acetate | PVB | 0.05 | 20 | 0.07 | Poor | Poor | 25.5 |
| 104 | Comp. Ex. Terpinyl methyl ether | PVB | 0.05 | 20 | 0.07 | Poor | Good | 18.5 |
| 105 | Comp. Ex. Isobornyl acetate | PVB | 0.05 | 20 | 0.07 | Poor | Good | 16 |
| 106 | Comp. Ex. Caryophyllene | PVB | 0.05 | 20 | 0.07 | Poor | Good | 18.5 |
| 107 | Comp. Ex. 1-dihydrocarvyl acetate | PVB | 0.05 | 20 | 0.07 | Poor | Good | 23 |
| 108 | Comp. Ex. Menthone | PVB | 0.05 | 20 | 0.07 | Poor | Poor | 29 |
| 109 | Comp. Ex. Menthyl acetate | PVB | 0.05 | 20 | 0.07 | Poor | Good | 21.5 |
| 110 | Comp. Ex. Perillyl acetate | PVB | 0.05 | 20 | 0.07 | Poor | Good | 22 |
| 111 | Comp. Ex. Carvyl acetate | PVB | 0.05 | 20 | 0.07 | Poor | Good | 20.5 |
| 112 | Comp. Ex. d-dihydrocarvyl acetate | PVB | 0.05 | 20 | 0.07 | Poor | Good | 19 |
| 113 | Comp. Ex. Butyl carbitol acetate | PVB | 0.05 | 20 | 0.07 | Poor | Good | 24 |
| 114 | Comp. Ex. Terpineol | PVB | 0.05 | 20 | 0.07 | Poor | Poor | 35.5 |

TABLE 7

Table 7

| Sample | | Type of solvent of electrode layer paste and blank paste | Type of resin | Release layer | | | | | Electrode layer and blank pattern layer peeling strength (mN/cm) |
|---|---|---|---|---|---|---|---|---|---|
| | | | | Average particle size of ceramic powder (μm) | Specific surface area of ceramic powder (m²/g) | Dry thickness (μm) | Sheet attack | Bleedout, shedding, and pinholes | |
| 121 | Comp. Ex. | Limonene | PVB | 0.05 | 20 | 0.05 | Poor | Poor | 28 |
| 122 | Comp. Ex. | Dihydroterpinyl methyl ether | PVB | 0.05 | 20 | 0.05 | Poor | Good | 21.5 |
| 123 | Comp. Ex. | α-terpinyl acetate | PVB | 0.05 | 20 | 0.05 | Poor | Poor | 27 |
| 124 | Comp. Ex. | Terpinyl methyl ether | PVB | 0.05 | 20 | 0.05 | Poor | Good | 18 |
| 125 | Comp. Ex. | Isobornyl acetate | PVB | 0.05 | 20 | 0.05 | Poor | Good | 17.5 |
| 126 | Comp. Ex. | Caryophyllene | PVB | 0.05 | 20 | 0.05 | Poor | Good | 22 |
| 127 | Comp. Ex. | 1-dihydrocarvyl acetate | PVB | 0.05 | 20 | 0.05 | Poor | Poor | 27 |
| 128 | Comp. Ex. | Menthone | PVB | 0.05 | 20 | 0.05 | Poor | Poor | 31.5 |
| 129 | Comp. Ex. | Menthyl acetate | PVB | 0.05 | 20 | 0.05 | Poor | Good | 23 |
| 130 | Comp. Ex. | Perillyl acetate | PVB | 0.05 | 20 | 0.05 | Poor | Poor | 24.5 |
| 131 | Comp. Ex. | Carvyl acetate | PVB | 0.05 | 20 | 0.05 | Poor | Poor | 22 |
| 132 | Comp. Ex. | d-dihydrocarvyl acetate | PVB | 0.05 | 20 | 0.05 | Poor | Poor | 18.5 |
| 133 | Comp. Ex. | Butyl carbitol acetate | PVB | 0.05 | 20 | 0.05 | Poor | Good | 29.5 |
| 134 | Comp. Ex. | Terpineol | PVB | 0.05 | 20 | 0.05 | Poor | Poor | 36 |

TABLE 8

Table 8

| Sample | | Type of solvent of electrode layer paste and blank paste | Type of resin | Release layer | | | | | Electrode layer and blank pattern layer peeling strength (mN/cm) |
|---|---|---|---|---|---|---|---|---|---|
| | | | | Average particle size of ceramic powder (μm) | Specific surface area of ceramic powder (m²/g) | Dry thickness (μm) | Sheet attack | Bleedout, shedding, and pinholes | |
| 141 | Comp. Ex. | Limonene | PVB | 0.05 | 20 | 0.2 | Good | Good | 16 |
| 142 | Comp. Ex. | Dihydroterpinyl methyl ether | PVB | 0.05 | 20 | 0.2 | Good | Good | 14.5 |
| 143 | Comp. Ex. | α-terpinyl acetate | PVB | 0.05 | 20 | 0.2 | Good | Good | 16 |
| 144 | Comp. Ex. | Terpinyl methyl ether | PVB | 0.05 | 20 | 0.2 | Good | Good | 14.5 |
| 145 | Comp. Ex. | Isobornyl acetate | PVB | 0.05 | 20 | 0.2 | Good | Good | 15 |
| 146 | Comp. Ex. | Caryophyllene | PVB | 0.05 | 20 | 0.2 | Good | Good | 15.5 |
| 147 | Comp. Ex. | 1-dihydrocarvyl acetate | PVB | 0.05 | 20 | 0.2 | Good | Good | 15.5 |
| 148 | Comp. Ex. | Menthone | PVB | 0.05 | 20 | 0.2 | Good | Good | 16 |
| 149 | Comp. Ex. | Menthyl acetate | PVB | 0.05 | 20 | 0.2 | Good | Good | 14.5 |
| 150 | Comp. Ex. | Perillyl acetate | PVB | 0.05 | 20 | 0.2 | Good | Good | 17 |
| 151 | Comp. Ex. | Carvyl acetate | PVB | 0.05 | 20 | 0.2 | Good | Good | 14.5 |
| 152 | Comp. Ex. | d-dihydrocarvyl acetate | PVB | 0.05 | 20 | 0.2 | Good | Good | 16 |
| 153 | Comp. Ex. | Butyl carbitol acetate | PVB | 0.05 | 20 | 0.2 | Good | Good | 15.5 |
| 154 | Comp. Ex. | Terpineol | PVB | 0.05 | 20 | 0.2 | Poor | Poor | 15.5 |

As shown in Tables 6 and 7, even when making the dry thickness of the release layer a further thinner 0.07 μm or 0.05 μm, good results could not be obtained like in Comparative Example 2.

Note that as shown in Sample Nos. 141 to 153 of Table 8, when making the dry thickness of the release layer a relatively thick 0.2 μm, use is possible without problem even when using a binder of the release layer comprised of polyvinyl butyral (PVB). However, if making the dry thickness a thick 0.2 μm, the dielectric characteristics end up deteriorating (see later Example 6).

Example 4

Except for making the ceramic powder contained in the release layer paste for forming the release layer the ceramic powder shown in Table 9 and changing the thickness when forming the release layer (target thickness) as shown in Table 9, the same procedure was followed as in Example 1 to form the release layer. The same procedure as in Sample No. 3 of Example 1 was followed to evaluate them. The results are shown in Table 9.

Note that in Example 4, the surface roughness was evaluated in addition to the evaluation items of Sample No. 3 of Example 1.

The surface roughness was evaluated by printing the above prepared electrode layer paste and blank pattern layer paste on the surface of the release layer under similar conditions to the evaluation of the bleedout, shedding, and pinholes to form an electrode layer and blank pattern layer, then measuring the electrode layer and blank pattern surface for surface roughness (Ra: effective value of surface roughness) using a "Surfcorder (SE-30D)" made by Kosaka Laboratories. If the surface roughness is large, short-circuit defects occur. Therefore, in this example, the case where the Ra was 0.1 μm or less was judged as good. The results are shown in Table 9.

Further, in Example 4, the dry thickness was evaluated by height measurement data from a confocal laser scanning microscope. Samples for which the result of the measurement showed a dry thickness of 20% or more greater than the thickness of the film formed were not possible. In Table 9, asterisks were appended to the value of the dry thickness.

TABLE 9

| Sample | | Type of solvent of electrode layer paste and blank paste | Type of resin | Release layer Average particle size of ceramic powder (μm) | Specific surface area of ceramic powder (m²/g) | Formed thickness (μm) | Dry thickness (μm) | Surface roughness Ra (μm) |
|---|---|---|---|---|---|---|---|---|
| 160 | Comp. Ex. | α-terpinyl acetate | Polyvinyl acetal | 0.1 | 10 | 0.2 | 0.2 | 0.076 |
| 161 | Ex. | α-terpinyl acetate | Polyvinyl acetal | 0.1 | 10 | 0.1 | 0.1 | 0.070 |
| 162 | Ref. Ex. | α-terpinyl acetate | Polyvinyl acetal | 0.1 | 10 | 0.07 | 0.09* | 0.079 |
| 163 | Ref. Ex. | α-terpinyl acetate | Polyvinyl acetal | 0.1 | 10 | 0.05 | 0.09* | 0.075 |
| 164 | Comp. Ex. | α-terpinyl acetate | Polyvinyl acetal | 0.07 | 14 | 0.2 | 0.2 | 0.079 |
| 165 | Ex. | α-terpinyl acetate | Polyvinyl acetal | 0.07 | 14 | 0.1 | 0.1 | 0.078 |
| 166 | Ex. | α-terpinyl acetate | Polyvinyl acetal | 0.07 | 14 | 0.07 | 0.07 | 0.072 |
| 167 | Ref. Ex. | α-terpinyl acetate | Polyvinyl acetal | 0.07 | 14 | 0.05 | 0.07* | 0.077 |
| 63 | Comp. Ex. | α-terpinyl acetate | Polyvinyl acetal | 0.05 | 20 | 0.2 | 0.2 | 0.073 |
| 3 | Ex. | α-terpinyl acetate | Polyvinyl acetal | 0.05 | 20 | 0.1 | 0.1 | 0.076 |
| 23 | Ex. | α-terpinyl acetate | Polyvinyl acetal | 0.05 | 20 | 0.07 | 0.07 | 0.085 |
| 43 | Ex. | α-terpinyl acetate | Polyvinyl acetal | 0.05 | 20 | 0.05 | 0.05 | 0.083 |
| 168 | Comp. Ex. | α-terpinyl acetate | Polyvinyl acetal | 0.02 | 50 | 0.2 | 0.2 | 0.134 |
| 169 | Ref. Ex. | α-terpinyl acetate | Polyvinyl acetal | 0.02 | 50 | 0.1 | 0.1 | 0.126 |
| 170 | Ref. Ex. | α-terpinyl acetate | Polyvinyl acetal | 0.02 | 50 | 0.07 | 0.07 | 0.121 |
| 171 | Ref. Ex. | α-terpinyl acetate | Polyvinyl acetal | 0.02 | 50 | 0.05 | 0.06 | 0.123 |
| 172 | Comp. Ex. | α-terpinyl acetate | Polyvinyl acetal | 0.2 | 5 | 0.2 | 0.2 | 0.073 |
| 173 | Comp. Ex. | α-terpinyl acetate | Polyvinyl acetal | 0.2 | 5 | 0.1 | 0.18* | 0.079 |
| 174 | Comp. Ex. | α-terpinyl acetate | Polyvinyl acetal | 0.2 | 5 | 0.07 | 0.17* | 0.077 |
| 175 | Comp. Ex. | α-terpinyl acetate | Polyvinyl acetal | 0.2 | 5 | 0.05 | 0.17* | 0.078 |

From the results of Sample Nos. 160 to 163 using ceramic powder comprised of powder of an average particle size of 0.1 μm and specific surface area of 10 m²/g, when making the average particle size of the ceramic powder contained in the release layer paste not more than the formed thickness when forming the release layer (Sample Nos. 160 and 161), formation at the desired thickness was possible. On the other hand, when making the average particle size of the ceramic powder larger than the formed thickness (Sample Nos. 162 and 163), the dry thickness ends up becoming larger than the formed thickness and good film formation was not possible.

Further, similar results were obtained even in Sample Nos. 164 to 167 using ceramic powder comprising powder having an average particle size of 0.07 μm and a specific surface area of 14 m²/g and Sample Nos. 63, 3, 23, and 43 using powder having an average particle size of 0.05 μm and a specific surface area of 20 m²/g.

From these results, it could be confirmed that if controlling the average particle size of the ceramic powder used, it becomes possible to further reduce the thickness of the release layer.

On the other hand, in Sample Nos. 168 to 171 using ceramic powder comprised of powder having an average particle size of 0.02 μm and a specific surface area of 50 m²/g had deteriorated surface roughness Ra of the obtained release layer. The reason is believed to be the overly large specific surface area of the ceramic powder used and therefore the occurrence of agglomeration of the ceramic powder.

Further, in Sample Nos. 172 to 175 using ceramic powder comprised of powder having an average particle size of 0.2 μm and a specific surface area of 5 m²/g, the average particle size of the ceramic powder was too large, so the thickness of the release layer could not be made 0.1 μm or less.

Note that if making the dry thickness a thick 0.2 μm (Sample Nos. 160, 164, 63, 168, and 172), the dielectric characteristics end up deteriorating (see later Example 6).

Example 5

Except for changing the conditions for forming the release layer as shown in Table 10, the same procedure was followed as in Example 1 to form the release layer and the same procedure was followed as in Example 1 to evaluate it. Note that in Table 10, the surface roughness Ra is the value obtained from the results of measurement by a method similar to Example 5.

In Table 10, Sample Nos. 3 and 190 to 193 are samples changing the content of polyvinyl acetal with respect to 100 parts by weight of ceramic powder and the ratio of the ceramic powder with respect to polyvinyl acetal and plasticizer (P/B).

Sample Nos. 3 and 194 to 197 are samples changing the polymerization degree of the polyvinyl acetal resin.

Sample Nos. 3, 198, and 199 are samples changing the acetalization degree of the polyvinyl acetal resin.

Sample Nos. 3 and 200 to 204 are samples changing the content of plasticizer with respect to 100 parts by weight of ceramic powder and the ratio of ceramic powder with respect to polyvinyl acetal and plasticizer (P/B).

TABLE 10

| Sample | | Type of solvent of electrode layer paste and blank paste | Type of resin of release layer | Release layer Ceramic powder (parts by weight) | Amount of resin (parts by weight) | Amount of plasticizer (parts by weight) | P/B |
|---|---|---|---|---|---|---|---|
| 190 | Comp. Ex. | α-terpinyl acetate | Polyvinyl acetal | 100 | 12 | 6 | 5.56 |
| 191 | Ex. | α-terpinyl acetate | Polyvinyl acetal | 100 | 16 | 8 | 4.17 |
| 3 | Ex. | α-terpinyl acetate | Polyvinyl acetal | 100 | 24 | 12 | 2.78 |
| 192 | Ex. | α-terpinyl acetate | Polyvinyl acetal | 100 | 50 | 25 | 1.33 |
| 193 | Comp. Ex. | α-terpinyl acetate | Polyvinyl acetal | 100 | 60 | 25 | 1.18 |
| 194 | Ref. Ex. | α-terpinyl acetate | Polyvinyl acetal | 100 | 24 | 12 | 2.78 |
| 195 | Ex. | α-terpinyl acetate | Polyvinyl acetal | 100 | 24 | 12 | 2.78 |
| 3 | Ex. | α-terpinyl acetate | Polyvinyl acetal | 100 | 24 | 12 | 2.78 |
| 196 | Ex. | α-terpinyl acetate | Polyvinyl acetal | 100 | 24 | 12 | 2.78 |
| 197 | Ref. Ex. | α-terpinyl acetate | Polyvinyl acetal | 100 | 24 | 12 | 2.78 |
| 3 | Ex. | α-terpinyl acetate | Polyvinyl acetal | 100 | 24 | 12 | 2.78 |
| 198 | Ex. | α-terpinyl acetate | Polyvinyl acetal | 100 | 24 | 12 | 2.78 |
| 199 | Ex. | α-terpinyl acetate | Polyvinyl acetal | 100 | 24 | 12 | 2.78 |
| 200 | Ref. Ex. | α-terpinyl acetate | Polyvinyl acetal | 100 | 24 | 0 | 4.17 |
| 201 | Ex. | α-terpinyl acetate | Polyvinyl acetal | 100 | 24 | 5 | 3.45 |
| 3 | Ex. | α-terpinyl acetate | Polyvinyl acetal | 100 | 24 | 12 | 2.78 |
| 202 | Ex. | α-terpinyl acetate | Polyvinyl acetal | 100 | 24 | 25 | 2.04 |
| 203 | Ex. | α-terpinyl acetate | Polyvinyl acetal | 100 | 24 | 50 | 1.35 |
| 204 | Ref. Ex. | α-terpinyl acetate | Polyvinyl acetal | 100 | 24 | 100 | 0.81 |

| Sample | Release layer Polymerization degree | Acetalization degree (mol %) | Amount of acetyl groups (mol %) | Surface roughness Ra (μm) | Sheet attack | Bleedout, shedding, and pinholes | Electrode layer and blank pattern layer peeling strength (mN/cm) |
|---|---|---|---|---|---|---|---|
| 190 | 2400 | 66 | 3 | 0.078 | Poor | Poor | 21.3 |
| 191 | 2400 | 66 | 3 | 0.066 | Good | Good | 18.5 |
| 3 | 2400 | 66 | 3 | 0.070 | Good | Good | 15.0 |
| 192 | 2400 | 66 | 3 | 0.077 | Good | Good | 13.2 |
| 193 | 2400 | 66 | 3 | 0.082 | Poor | Good | 16.3 |
| 194 | 1700 | 66 | 3 | 0.065 | Poor | Poor | 22.0 |
| 195 | 2000 | 66 | 3 | 0.073 | Good | Good | 17.8 |
| 3 | 2400 | 66 | 3 | 0.070 | Good | Good | 15.0 |
| 196 | 3600 | 66 | 3 | 0.087 | Good | Good | 16.3 |
| 197 | 3700 | 66 | 3 | 0.103 | Good | Good | 16.4 |
| 3 | 2400 | 66 | 3 | 0.070 | Good | Good | 15.0 |
| 198 | 2400 | 72 | 3 | 0.076 | Good | Good | 16.3 |
| 199 | 2400 | 74 | 3 | 0.069 | Good | Good | 15.9 |
| 200 | 2400 | 66 | 3 | 0.073 | Good | Good | 21.5 |
| 201 | 2400 | 66 | 3 | 0.068 | Good | Good | 18.5 |
| 3 | 2400 | 66 | 3 | 0.070 | Good | Good | 15.0 |
| 202 | 2400 | 66 | 3 | 0.066 | Good | Good | 16.3 |
| 203 | 2400 | 68 | 3 | 0.078 | Good | Good | 15.5 |
| 204 | 2400 | 66 | 3 | 0.073 | Poor | Good | 14.0 | where, average particle size of ceramic powder of release layer: 0.05 μm
specific surface area of ceramic powder of release layer: 20 m²/g
dry thickness of release layer 0.1 μm From Table 10, it can be confirmed that samples where the content of the polyvinyl acetal, the P/B, the polymerization degree of the polyvinyl acetal resin, or the content of the plasticizer is outside the preferable range of the present invention tended not to give good results.

Example 6

Green Sheet Paste

First, an additive (subcomponent) material mixture of the same composition as Example 1 (Sample 3 of Table 1) was prepared.

Next, the obtained additive material mixture in an amount of 4.3 parts by weight, ethyl alcohol in 3.11 parts by weight, n-propanol in 3.11 parts by weight, xylene in 1.11 parts by weight, and a dispersion agent in 0.04 part by weight were mixed and pulverized using a ball mill to obtain an additive slurry. The mixing and pulverization were performed using a 250 cc polyethylene resin vessel, charging it with 450 g of 2 mmφ ZrO₂ media, and operating it at a peripheral speed of 45 m/min for 16 hours. Further, the additive material after pulverization had a particle size of a median size of 0.1 μm.

Next, the obtained additive slurry in an amount of 11.65 parts by weight, BaTiO₃ powder (BT-02/Sakai Chemical Industry) in 100 parts by weight, ethyl alcohol in 35.32 parts by weight, n-propanol in 35.32 parts by weight, xylene in 16.32 parts by weight, dioctyl phthalate (plasticizer) in 2.61 parts by weight, a mineral spirit in 7.3 parts by weight, a dispersion agent in 2.36 parts by weight, an anti-static aid in 0.42 part by weight, an organic vehicle in 33.74 parts by weight, MEK in 43.81 parts by weight, and 2-butoxyethanol in 43.81 parts by weight were mixed using a ball mill to obtain a green sheet paste.

Further, the mixing by the ball mill was performed using a 500 cc polyethylene resin vessel, charging it with 900 g of 2 mmφ $ZrO_2$ media, and operating it under conditions of a peripheral speed of 45 m/min for 20 hours. Further, the above organic vehicle was prepared by stirring and dissolving a polyvinyl butyral resin having a polymerization degree of 1450 and a butyralization degree of 69% (made by Sekisui Chemical Industry) in an amount of 15 parts by weight into ethanol in 42.5 parts by weight and propanol in 42.5 parts by weight at a temperature of 50° C. That is, the resin content in the organic vehicle (amount of polyvinyl butyral resin) was made 15 wt %.

Adhesive Layer Paste

A butyral resin (polymerization degree of 800, butyralization degree of 77%) in an amount of 2 parts by weight, MEK in 98 parts by weight, and DOP (dioctyl phthalate) in 1 part by weight were stirred to dissolve to prepare an adhesive layer paste.

Preparation of Samples of Multilayer Ceramic Capacitors

The release layer pastes, electrode layer pastes, and blank pattern layer pastes prepared in Example 1 and the green sheet paste and adhesive layer paste prepared in this example were used in the following way to produce multilayer ceramic capacitors 2 shown in FIG. 1.

Formation of Green Sheet

First, in the same way as Example 1, a PET film was formed with release layer to give a dry thickness shown in Table 11 and the release layer was formed on its surface with an electrode layer and blank pattern layer (dry thickness of 1 μm).

Next, the electrode layer and blank pattern were coated with the above green sheet paste by a die coater, then dried to form a green sheet and obtain a green sheet 10a having an electrode layer 12a and blank pattern 24. The cooling rate was made 50 m/min, and the drying was performed using a drying oven with an oven temperature of 80° C. The green sheets were formed to give thicknesses when dry of the thicknesses shown in Table 11.

Formation of Adhesive Layer and Transfer of Adhesive Layer

First, another PET film (second supporting sheet) was prepared. This PET film was coated with the above adhesive layer paste by a die coater, then dried to form an adhesive layer. The coating speed was made 70 m/min, while the drying was performed using a drying oven with an oven temperature of 80° C. The adhesive layer was formed to give a thickness after drying of 0.1 μm. Further, the second supporting sheet, unlike the first supporting sheet, was treated on its surface with a silicone-based resin to facilitate releasing.

Next, the adhesive layer 28 was transferred onto the green sheet 10a having the electrode layer 12a and blank pattern 24 by the method shown in FIG. 3A to FIG. 3C to form a laminate unit U1a. At the time of transfer, a pair of rolls was used. The pressing force was made 0.1 MPa, the transfer temperature 80° C., and the transfer speed 2 m/min. It was confirmed that the transfer could be performed well.

Preparation of Green Chip

First, a plurality of external layer green sheets formed to thicknesses of 10 μm were stacked to give a thickness at the time of stacking of about 50 μm so as to form an external layer forming the cap part (cover layer) of the multilayer capacitor after firing. Further, the external layer green sheets were green sheets formed using the above produced green sheet coating to give a thickness after drying of 10 μm.

Next, the method shown in FIG. 3A to FIG. 4B was used to stack 100 of the above produced laminate units. Further, a plurality of external layer green sheets formed to thicknesses of 10 μm were stacked to give a thickness at the time of stacking of about 50 μm so as to form an external layer forming the cap part (cover layer) of the multilayer capacitor after firing. Further, the obtained laminate was pressed under conditions of 100 MPa and 70° C., then cut by a dicing machine to obtain a pre-fired green chip.

Preparation of Sintered Body

Next, the final laminate was cut to a predetermined size and treated to remove the binder, fire it, and anneal it (heat treat it) so as to prepare a chip-shaped sintered body.

The binder was removed at a temperature elevation rate of 50° C./hour, a holding temperature of 240° C., a holding time of 8 hours, and an atmospheric gas of the air. The firing was performed at a temperature elevation rate of 300° C./hour, a holding temperature of 1200° C., a holding time of 2 hours, a cooling rate of 300° C./hour, and an atmospheric gas of a mixed gas of $N_2$ gas controlled to a dew point of 20° C. and $H_2$ (5%). The annealing (reoxidation) was performed at a holding time of 3 hours, a cooling rate of 300° C./hour, and an atmospheric gas of $N_2$ gas controlled to a dew point of 20° C. Further, the atmospheric gas was wet using a wetter at a water temperature of 0 to 75° C.

Next, the end faces of the chip-shaped sintered body were polished by sand blasting, then an In—Ga alloy paste was coated on the ends and then fired to form external electrodes and obtain a sample of a multilayer ceramic capacitor of the configuration shown in FIG. 1. In this example, as shown in Table 11, a number of samples changed in thickness of the release layer and thickness of the green sheet (Sample Nos. 205 to 216) were prepared and the samples evaluated for rate of retention of dielectric characteristics as explained below.

Rate of Retention of Permittivity

The rate of retention of permittivity was evaluated by comparing the permittivity of a single dielectric layer (hereinafter suitably called the "Permittivity A") and the permittivity in a capacitor sample (hereinafter suitably called the "Permittivity B"). Specifically, the following formula (1) was used to find the drop in permittivity.

Rate of retention of permittivity (%)={Permittivity of dielectric layer (Permittivity $A$)/Permittivity of capacitor sample (Permittivity $B$)}×100   (1)

The permittivity of a single dielectric layer (Permittivity A) and the permittivity of a capacitor sample (Permittivity B) were calculated from the electrostatic capacity of a dielectric layer sample and capacitor sample measured at a reference temperature of 25° C. by inputting a signal of a frequency of 1 kHz and an input signal level (measured voltage) of 1.0 Vrms into a digital LCR meter (made by YHP, 4284A). Note that a single dielectric layer sample was fabricated by forming a single layer of green sheet (dry thickness: 1.0 μm) without using a release layer, then firing it under the above conditions. A rate of retention of dielectric characteristics of 80% or more was deemed as "good".

TABLE 11

| Sample | | Green sheet thickness (μm) | Release layer thickness (μm) | Total thickness of green sheet and release layer (μm) | Permittivity (dielectric layer) | Permittivity (capacitor) | Rate of retention of dielectric characteristics (%) |
|---|---|---|---|---|---|---|---|
| 205 | Comp. Ex. | 0.8 | 0.2 | 1.0 | 2800 | 1660 | 59.3 |
| 206 | Comp. Ex. | 0.6 | 0.2 | 0.8 | 2800 | 1520 | 54.3 |
| 207 | Comp. Ex. | 0.4 | 0.2 | 0.6 | 2800 | 1320 | 47.1 |
| 208 | Comp. Ex. | 0.2 | 0.2 | 0.4 | 2800 | 980 | 35.0 |
| 209 | Ex. | 0.9 | 0.1 | 1.0 | 2800 | 2660 | 95.0 |
| 210 | Ex. | 0.7 | 0.1 | 0.8 | 2800 | 2580 | 92.1 |
| 211 | Ex. | 0.5 | 0.1 | 0.6 | 2800 | 2520 | 90.0 |
| 212 | Ex. | 0.3 | 0.1 | 0.4 | 2800 | 2460 | 87.9 |
| 213 | Ex. | 0.95 | 0.05 | 1.0 | 2800 | 2760 | 98.6 |
| 214 | Ex. | 0.75 | 0.05 | 0.8 | 2800 | 2720 | 97.1 |
| 215 | Ex. | 0.55 | 0.05 | 0.6 | 2800 | 2720 | 97.1 |
| 216 | Ex. | 0.35 | 0.05 | 0.4 | 2800 | 2640 | 94.3 |

As shown in Table 11, when making the total of the thickness of the green sheet and the thickness of the release layer a thin 1 μm or less, it can be confirmed that making the thickness of the release layer 0.1 μm or less (Sample Nos. 209 to 213) results in a rate of retention of permittivity of 80% or more and good retention of permittivity. On the other hand, making the thickness of the release layer a thick 0.2 μm (Sample Nos. 205 to 208) results in great deterioration of the permittivity. Therefore, from this Table 11, it can be confirmed that it is desirable to make the thickness of the release layer a thin 0.1 μm or less.

The invention claimed is:

1. A method of production of a multilayer type electronic device comprising:
   forming a release layer of a thickness of 0.05 to 0.1 μm on a releasing side of a first supporting sheet treated for releasing, the release layer being formed from a release layer paste comprising:
      a ceramic powder having an average particle size from 0.02 μm to 0.1 μm,
      an organic vehicle containing a binder having polyvinyl acetal as its main ingredient,
      a plasticizer, and
      a dispersion agent,
      wherein a ratio (P/B) of said ceramic powder with respect to said binder and plasticizer is from 1.33 to less than 5.56,
   forming an electrode layer on the surface of said release layer in a predetermined pattern,
   forming a green sheet on the surface of said electrode layer to obtain a green sheet having an electrode layer,
   stacking said green sheets having electrode layers to form a green chip, and
   firing said green chip.

2. A method of production of a multilayer type electronic device comprising:
   forming a release layer of a thickness of 0.05 to 0.1 μm on a releasing side of a first supporting sheet treated for releasing, the release layer being formed from a release layer paste comprising:
      a ceramic powder having an average particle size from 0.02 μm to 0.1 μm,
      an organic vehicle containing a binder having polyvinyl acetal as its main ingredient,
      a plasticizer, and
      a dispersion agent,
      wherein said binder is in an amount of more than 12 up to 50 parts by weight with respect to 100 parts by weight of said ceramic powder,
   forming an electrode layer on the surface of said release layer in a predetermined pattern,
   forming a green sheet on the surface of said electrode layer to obtain a green sheet having an electrode layer,
   stacking said green sheets having electrode layers to form a green chip, and firing said green chip.

3. The method of production of a multilayer type electronic device as set forth in claim 1, further comprising treating said first supporting sheet for releasing by coating it with a release agent mainly comprised of silicone and controlling a peeling strength of said first supporting sheet from 8 to 20 mN/cm (excluding 8 mN/cm).

4. The method of production of a multilayer type electronic device as set forth in claim 2, further comprising treating said first supporting sheet for releasing by coating it with a release agent mainly comprised of silicone and controlling a peeling strength of said first supporting sheet to 8 from 20 mN/cm (excluding 8 mN/cm).

5. The method of production of a multilayer type electronic device as set forth in claim 1, further comprising treating said first supporting sheet for releasing by coating it with a release agent mainly comprised of an alkyd resin and controlling a peeling strength of said first supporting sheet from 50 to 130 mN/cm (excluding 50 mN/cm and 130 mN/cm).

6. The method of production of a multilayer type electronic device as set forth in claim 2, further comprising treating said first supporting sheet for releasing by coating it with a release agent mainly comprised of an alkyd resin and controlling a peeling strength of said first supporting sheet to 50 from 130 mN/cm (excluding 50 mN/cm and 130 mN/cm).

7. The method of production of a multilayer type electronic device as set forth in claim 1, wherein the ceramic powder contained in the release layer paste has the same composition as the ceramic powder contained in the paste for forming the green sheet.

8. The method of production of a multilayer type electronic device as set forth in claim 2, wherein the ceramic powder contained in the release layer paste has the same composition as the ceramic powder contained in the paste for forming the green sheet.

9. The method of production of a multilayer type electronic device as set forth in claim 1, wherein a thickness of said release layer and a thickness of said green sheet minus the thickness of the electrode layer part total 1.0 μm or less.

10. The method of production of a multilayer type electronic device as set forth in claim 2, wherein a thickness of said release layer and a thickness of said green sheet minus the thickness of the electrode layer part total 1.0 μm or less.

11. The method of production of a multilayer type electronic device as set forth in claim 1, further comprising, before forming said green sheet, forming on the surface of said release layer where said electrode layer is not formed a blank pattern layer to the same thickness as said electrode layer and of the same material as said green sheet.

12. The method of production of a multilayer type electronic device as set forth in claim 2, further comprising, before forming said green sheet, forming on the surface of said release layer where said electrode layer is not formed a blank pattern layer to the same thickness as said electrode layer and of the same material as said green sheet.

13. The method of production of a multilayer type electronic device as set forth in claim 1, further comprising before stacking said green sheets having electrode layers, forming an adhesive layer on the surface of said green sheet having electrode layers opposite to the electrode layer side and stacking said green sheets having electrode layers through said adhesive layers.

14. The method of production of a multilayer type electronic device as set forth in claim 2, further comprising before stacking said green sheets having electrode layers, forming an adhesive layer on the surface of said green sheet having electrode layers opposite to the electrode layer side and stacking said green sheets having electrode layers through said adhesive layers.

15. The method of production of a multilayer type electronic device as set forth in claim 1, wherein said polyvinyl acetal has a polymerization degree of 2000 to 3600 and an acetalization degree of 66 to 74 mol %.

16. The method of production of a multilayer type electronic device as set forth in claim 2, wherein said polyvinyl acetal has a polymerization degree of 2000 to 3600 and an acetalization degree of 66 to 74 mol %.

17. The method of production of a multilayer type electronic device as set forth in claim 1, wherein said plasticizer is at least one plasticizer selected from the group of dibutyl phthalate (DBP), dioctyl phthalate (DOP), and butylbenzyl phthalate (BBP) and is contained in an amount of 0 to 100 parts by weight (excluding 0 part by weight and 100 parts by weight) with respect to 100 parts by weight of said ceramic powder.

18. The method of production of a multilayer type electronic device as set forth in claim 2, wherein said plasticizer is at least one plasticizer selected from the group of dibutyl phthalate (DBP), dioctyl phthalate (DOP), and butylbenzyl phthalate (BBP) and is contained in an amount of 0 to 100 parts by weight (excluding 0 part by weight and 100 parts by weight) with respect to 100 parts by weight of said ceramic powder.

19. The method of production of a multilayer type electronic device as set forth in claim 1, wherein said dispersion agent is a nonionic dispersion agent and is contained in an amount of 1 to 3 parts by weight with respect to 100 parts by weight of said ceramic powder.

20. The method of production of a multilayer type electronic device as set forth in claim 2, wherein said dispersion agent is a nonionic dispersion agent and is contained in an amount of 1 to 3 parts by weight with respect to 100 parts by weight of said ceramic powder.

21. The method of production of a multilayer type electronic device as set forth in claim 1, wherein said organic vehicle contains at least one solvent selected from the group consisting of ethyl alcohol, methylethylketone, methylisobutylketone, propanol, xylene, and toluene and contained so as to give a concentration of nonvolatile ingredients of 5 to 20 wt %.

22. The method of production of a multilayer type electronic device as set forth in claim 2, wherein said organic vehicle contains at least one solvent selected from the group consisting of ethyl alcohol, methylethylketone, methylisobutylketone, propanol, xylene, and toluene and contained so as to give a concentration of nonvolatile ingredients of 5 to 20 wt %.

23. The method of production of a multilayer type electronic device as set forth in claim 1, wherein the electrode layer is formed from an electrode layer paste comprising:
 a binder comprising ethyl cellulose; and
 one or more solvents selected from the group consisting of limonene, dihydroterpinyl methyl ether, α-terpinyl acetate, terpinyl methyl ether, isobomyl acetate, caryophyllene, 1-dihydrocarvyl acetate, menthone, menthyl acetate, perillyl acetate, carvyl acetate, d-dihydrocarvyl acetate, and butyl carbitol acetate.

24. The method of production of a multilayer type electronic device as set forth in claim 2, wherein the electrode layer is formed from an electrode layer paste comprising:
 a binder comprising ethyl cellulose; and
 one or more solvents selected from the group consisting of limonene, dihydroterpinyl methyl ether, α-terpinyl acetate, terpinyl methyl ether, isobomyl acetate, caryophyllene, 1-dihydrocarvyl acetate, menthone, menthyl acetate, perillyl acetate, carvyl acetate, d-dihydrocarvyl acetate, and butyl carbitol acetate.

* * * * *